United States Patent
Yayama

(10) Patent No.: US 9,639,171 B2
(45) Date of Patent: May 2, 2017

(54) MOTOR DRIVE DEVICE

(75) Inventor: Takahiro Yayama, Mie (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 453 days.

(21) Appl. No.: 14/343,057

(22) PCT Filed: Sep. 11, 2012

(86) PCT No.: PCT/JP2012/073162
§ 371 (c)(1),
(2), (4) Date: Mar. 7, 2014

(87) PCT Pub. No.: WO2013/042578
PCT Pub. Date: Mar. 28, 2013

(65) Prior Publication Data
US 2014/0198039 A1 Jul. 17, 2014

(30) Foreign Application Priority Data

Sep. 21, 2011 (JP) .................. 2011-205507

(51) Int. Cl.
*G06F 3/02* (2006.01)
*H02P 29/00* (2016.01)
*H02P 27/00* (2006.01)

(52) U.S. Cl.
CPC .............. *G06F 3/02* (2013.01); *H02P 27/00* (2013.01); *H02P 29/00* (2013.01)

(58) Field of Classification Search
CPC ........................................................ H02P 5/74
USPC ............................................. 318/34, 3, 558
See application file for complete search history.

(56) References Cited

U.S. PATENT DOCUMENTS

| 4,743,818 A * | 5/1988 | Quayle | H02H 7/0822 |
| | | | 318/473 |
| 5,510,809 A | 4/1996 | Sakai et al. | |
| 5,654,739 A | 8/1997 | Sakai et al. | |
| 8,375,317 B2 * | 2/2013 | Yamaichi | H02P 23/0077 |
| | | | 318/625 |

(Continued)

FOREIGN PATENT DOCUMENTS

| CN | 101932982 | 12/2010 |
| EP | 0535340 | 4/1993 |

(Continued)

OTHER PUBLICATIONS

Japanese Office Action for Patent Application No. 2011-205507 dated Jun. 15, 2015.

(Continued)

*Primary Examiner* — David S Luo
(74) *Attorney, Agent, or Firm* — Young & Thompson

(57) ABSTRACT

In a motor drive device (1) the motor driving setting of which is performed by a setting display unit (20), the setting display unit (20) displays a setting content of a setting item when the setting content of the setting item is changed, and further displays related information (an input value, an output detection value, a computed value calculated by the controller) of at least one or more related items, which are related to the setting item. By using the setting display unit which simultaneously displays the setting content and the related information necessary for setting, it is possible to set the motor drive device (1) easily and quickly.

11 Claims, 16 Drawing Sheets

(56) References Cited

U.S. PATENT DOCUMENTS

2002/0172510 A1* 11/2002 Kobayashi ............ G05B 19/23
388/800

FOREIGN PATENT DOCUMENTS

| JP | 64-026393 | 1/1989 |
|----|-----------|--------|
| JP | 03-052590 | 3/1993 |
| JP | 05-088744 | 4/1993 |
| JP | 5-224731 | 9/1993 |
| JP | 07-177759 | 7/1995 |
| JP | 2003-61388 | 2/2003 |
| JP | 2004-015943 | 1/2004 |
| JP | 2004-147440 | 5/2004 |

OTHER PUBLICATIONS

Chinese Office Action dated Nov. 25, 2015, with English Translation; Application No. 2012800424756.
International Search Report—PCT/JP2012/073162—Nov. 20, 2012.
Extended European search report, dated Jun. 27, 2016; Application No. 12834562.6.

* cited by examiner

FIG. 5

| Setting Item / Setting Content | Related Item 1 | Related Item 2 | Related Item 3 | Related Item 4 |
|---|---|---|---|---|
| SETTING ITEM 1: a1 / SETTING CONTENT: a2 | RELATED ITEM 1: b1 / RELATED INFORMATION: INPUT VALUE 1 | RELATED ITEM 2: c1 / RELATED INFORMATION: INPUT VALUE 2 | RELATED ITEM 3: d1 / RELATED INFORMATION: INPUT VALUE 3 | RELATED ITEM 4: e1 / RELATED INFORMATION: INPUT VALUE 4 |
| SETTING ITEM 2: a3 / SETTING CONTENT: a4 | RELATED ITEM 1: b2 / RELATED INFORMATION: DETECTION VALUE 1 | RELATED ITEM 2: c2 / RELATED INFORMATION: DETECTION VALUE 2 | RELATED ITEM 3: d2 / RELATED INFORMATION: DETECTION VALUE 3 | RELATED ITEM 4: e2 / RELATED INFORMATION: DETECTION VALUE 4 |
| SETTING ITEM 3: a5 / SETTING CONTENT: a6 | RELATED ITEM 1: b3 / RELATED INFORMATION: COMPUTED VALUE 1 | RELATED ITEM 2: c3 / RELATED INFORMATION: COMPUTED VALUE 2 | RELATED ITEM 3: d3 / RELATED INFORMATION: COMPUTED VALUE 3 | RELATED ITEM 4: e3 / RELATED INFORMATION: COMPUTED VALUE 4 |
| SETTING ITEM 4: a7 / SETTING CONTENT: a8 | RELATED ITEM 1: b4 / RELATED INFORMATION: GRAPH 1 | RELATED ITEM 2: c4 / RELATED INFORMATION: GRAPH 2 | RELATED ITEM 3: d4 / RELATED INFORMATION: GRAPH 3 | RELATED ITEM 4: e4 / RELATED INFORMATION: GRAPH 4 |
| SETTING ITEM 5: a9 / SETTING CONTENT: a10 | RELATED ITEM 1: b5 / RELATED INFORMATION: INPUT VALUE 1 | RELATED ITEM 2: c5 / RELATED INFORMATION: INPUT VALUE 1 | | |
| SETTING ITEM 6: a11 / SETTING CONTENT: a12 | RELATED ITEM 1: b6 / RELATED INFORMATION: DETECTION VALUE 1 | RELATED ITEM 2: c6 / RELATED INFORMATION: DETECTION VALUE 1 | | |
| SETTING ITEM 7: a13 / SETTING CONTENT: a14 | RELATED ITEM 1: b7 / RELATED INFORMATION: INPUT VALUE 1 | RELATED ITEM 2: c7 / RELATED INFORMATION: COMPUTED VALUE 1 | | |
| SETTING ITEM 8: a15 / SETTING CONTENT: a16 | RELATED ITEM 1: b8 / RELATED INFORMATION: COMPUTED VALUE 1 | RELATED ITEM 2: c8 / RELATED INFORMATION: GRAPH 1 | | |
| SETTING ITEM 9: a17 / SETTING CONTENT: a18 | RELATED ITEM 1: b9 / RELATED INFORMATION: DETECTION VALUE 1 | RELATED ITEM 2: c9 / RELATED INFORMATION: GRAPH 1 | | |
| SETTING ITEM 10: a19 / SETTING CONTENT: a20 | RELATED ITEM 1: b10 / RELATED INFORMATION: COMPUTED VALUE 1 | RELATED ITEM 2: c10 / RELATED INFORMATION: GRAPH 1 | | |
| SETTING ITEM 11: a21 / SETTING CONTENT: a22 | RELATED ITEM 1: b11 / RELATED INFORMATION: INPUT VALUE 1 | RELATED ITEM 2: c11 / RELATED INFORMATION: DETECTION VALUE 1 | RELATED ITEM 3: d11 / RELATED INFORMATION: COMPUTED VALUE 1 | |
| SETTING ITEM 12: a23 / SETTING CONTENT: a24 | RELATED ITEM 1: b12 / RELATED INFORMATION: INPUT VALUE 1 | RELATED ITEM 2: c12 / RELATED INFORMATION: DETECTION VALUE 1 | RELATED ITEM 3: d12 / RELATED INFORMATION: GRAPH 1 | |
| SETTING ITEM 13: a25 / SETTING CONTENT: a26 | RELATED ITEM 1: b13 / RELATED INFORMATION: INPUT VALUE 1 | RELATED ITEM 2: c13 / RELATED INFORMATION: COMPUTED VALUE 1 | RELATED ITEM 3: d13 / RELATED INFORMATION: GRAPH 1 | |
| SETTING ITEM 14: a27 / SETTING CONTENT: a28 | RELATED ITEM 1: b14 / RELATED INFORMATION: DETECTION VALUE 1 | RELATED ITEM 2: c14 / RELATED INFORMATION: COMPUTED VALUE 1 | RELATED ITEM 3: d14 / RELATED INFORMATION: GRAPH 1 | |
| SETTING ITEM 15: a29 / SETTING CONTENT: a30 | RELATED ITEM 1: b15 / RELATED INFORMATION: INPUT VALUE 1 | RELATED ITEM 2: c15 / RELATED INFORMATION: DETECTION VALUE 1 | RELATED ITEM 3: d15 / RELATED INFORMATION: GRAPH 1 | RELATED ITEM 4: d15 / RELATED INFORMATION: GRAPH 1 |
| ... | ... | ... | ... | ... |

FIG. 10

| SETTING ITEM | RELATED ITEM 1 | RELATED ITEM 2 |
|---|---|---|
| ... | ... | ... |
| F44:CURRENT LIMITATION (OPERATIONAL LEVEL) | OUTPUT CURRENT VALUE (%) | OUTPUT CURRENT VALUE (A) |
| E40:PID DISPLAY COEFFICIENT A | FEEDBACK VALUE BEFORE CONVERSION (%) | VALUE AFTER APPLICATION OF DISPLAY COEFFICIENT |
| E41:PID DISPLAY COEFFICIENT B | FEEDBACK VALUE BEFORE CONVERSION (%) | VALUE AFTER APPLICATION OF DISPLAY COEFFICIENT |
| E50:SPEED DISPLAY COEFFICIENT | OUTPUT FREQUENCY INSIDE AMOUNT (Hz) | SPEED VALUE AFTER CONVERSION |
| E32:I2-TERMINAL INPUT GAIN | I2-TERMINAL INPUT VOLTAGE (V) | INSIDE AMOUNT AFTER CONVERSION (%) |
| E37:C1-TERMINAL INPUT GAIN | C1-TERMINAL INPUT CURRENT (mA) | INSIDE AMOUNT AFTER CONVERSION (%) |
| E42:V2-TERMINAL INPUT GAIN | V2-TERMINAL INPUT VOLTAGE (V) | INSIDE AMOUNT AFTER CONVERSION (%) |
| J1-22:P1D1 (UPPER LIMIT ALARM AH) | PID FEEDBACK VALUE (MPa) | DEFLECTION VALUE (MPa) |
| ... | ... | ... |

MOTOR DRIVE DEVICE

TECHNICAL FIELD

The present invention relates to a motor drive device that drives a motor on the basis of setting from a setting display unit.

BACKGROUND ART

An inverter, which performs the variable speed control of a motor such as an AC motor, is known as a motor drive device. Such a motor drive device can adjust the setting contents of various setting items. The motor drive device changes operating characteristics or obtains consistency with an external device by the adjustment of the setting contents.

First, the change of the operating characteristics will be described. The change of the rotational speed of a motor will be described as a specific example of the change of the operating characteristics. A motor drive device is connected to an external device. The external device is an external console panel, a host controller, or a signal transmitter. A setting signal is output from the external device. The setting signal is an analog voltage signal, an analog current signal, a pulse signal, or a signal similar thereto. When the setting signal is input to the motor drive device, the motor drive device sets the rotational speed. The change of the operating characteristics is performed in this way.

Subsequently, the consistency with an external device will be described. The motor drive device performs the adjustment (scaling) of a relationship between a setting signal to be input and an internal command value of the motor drive device according to use or the combination with the external device. The motor drive device includes an adjuster for adjusting a conversion factor such as a gain or an offset of an analog input. For example, a DC voltage signal in the range of +1 V to +5 V, which is applied from the outside to an input terminal to which a voltage of full scale in the range of 0 V to +10 V can be input, can be adjusted so as to be regarded in the range of 0% to 100% of an internal command. +1 V corresponds to an offset. Further, when a % is set, a gain can be set by computation. For example, when 50% is set, a gain is 3 V. The consistency with an external device is obtained in this way.

Further, for example, an invention disclosed in PTL 1 (JP-A-07-177759, title of the invention "INVERTER OPERATING DEVICE") is known as the related art that performs setting of a motor drive device.

In this inverter operating device, information affecting the operation of an inverter is selected and displayed on a display. Specifically, when an operation for increasing a set value is performed by an increase key of the inverter operating device, the inverter operating device simultaneously displays three values, that is, the current value of the set value, a changed value after the operation, and the maximum allowable value of the set value. Accordingly, the operation of the inverter becomes easy and accurate.

Further, for example, an invention disclosed in PTL 2 (JP-A-03-52590, title of the invention "FUNCTION SETTING METHOD FOR INVERTER BY TWO-DIMENSIONAL GRAPH") is known as another related art.

In this function setting method, a 7-Segment light-emitting diode (LED) and a liquid-crystal display (LCD) are used together with each other. The 7-Segment light-emitting diode (LED) displays a code number of a function to be set. The liquid-crystal display (LCD) displays a two-dimensional graph, which shows the contents of the function to be set corresponding to the code number, and the setting data thereof. Accordingly, it is possible to reduce the risk of erroneous function setting and the time that is required for setting.

CITATION LIST

Patent Literature

[PTL 1] JP-A-07-177759 (see Paragraph [0015] of specification and FIG. 1)
[PTL 2] JP-A-03-52590 (see FIG. 1)

SUMMARY OF INVENTION

Technical Problem

In the above-mentioned related art, a DC voltage signal in the range of +1 V to +5 V, which is applied from the outside to an input terminal to which a voltage of full scale in the range of 0 V to +10 V can be input, can be adjusted so as to be regarded as the range of 0% to 100% of an internal command. An example in which a conversion factor is defined from the specifications of an external device or a general conversion formula as described above has been described. In this case, setting is easy.

However, the conversion factor of the motor drive device may be different from setting. In the previous example, 10 V may be changed into 9.8 V due to voltage drop or the like caused by wiring impedance in a terminal to which a voltage of full scale in the range of 0 V to +10 V can be input. In this case, fine adjustment is further required from setting.

When fine adjustment is performed, a set value of the conversion factor is increased or decreased while a conversion factor displayed by an operation display of the motor drive device is gradually checked. Further, an output is detected using a special measuring instrument such as a tester that is separately prepared, or adjustment is performed while adequateness is verified by the checking of the quality of test working or the like.

That is, a screen of a display section, which displays a value after conversion displayed by the operation display, and a screen of a display section of a special measuring instrument, which measures an actual operation, need to be alternately checked. In this case, if the operation display and the special measuring instrument are distant from each other, an operator needs to come and go to the installed locations thereof several times and repeat an operation for changing the setting several times until the completion of adjustment. As described above, setting in the related art is troublesome and inefficient.

Further, the related art disclosed in PTL 1 and PTL 2 has such problems likewise.

Accordingly, the invention has been made in consideration of the above-mentioned problem, and an object of the invention is to provide a motor drive device that can easily and quickly perform setting by using a setting display unit displaying related information required for setting in addition to the setting content.

Solution to Problem

The invention provides a motor drive device that is set by a setting display unit. The setting display unit including: a means for displaying a setting content of a setting item and further displaying related information of at least one or more related items, which are related to the setting item.

The invention provides a motor drive device comprising a setting display unit and a drive device body. The motor drive device is set by the setting display unit. The drive device body includes: a storage section, wherein at least one or more related items are registered in association with the first setting item in the storage section; and a motor drive controller connected to the storage section. The setting display unit includes: an operation section that selects the setting item and changes the setting content of the selected setting item; a display section that displays the setting item, the setting content of the setting item, the related items, and related information of the related items; and a setting display controller connected to the operation section, the display section, and the motor drive controller. When the motor drive device is being set by the setting display unit, the setting display controller functions as: a setting content change means for receiving change of the setting content; a setting content notification means for notifying the motor drive controller of the changed setting content; a related information request means for requesting the motor drive controller to notify the setting display controller of related information that is changed according to the changed setting content; a display means for displaying the related information, which is notified from the motor drive controller, on the display section; and a decision means for deciding the setting content, wherein the setting display controller functions as the decision means after repeatedly functioning as the setting content change means, the setting content notification means, the related information request means, and the display means.

The display section includes: a first display section that is formed of a 7-Segment LED; and a second display section that is formed of a liquid-crystal display. It is preferable that the setting display controller functions as: a display means for causing the first display section to display the setting content or the related information, which is related to a numerical value and for causing the second display section to display the setting content or the related information, which is related to a numerical value, a letter or a figure.

The related information of the related item is at least one of an input value that is obtained by detecting an input from the outside, a detection value that is obtained by detecting an output, a computed value that is calculated by the motor drive controller, and a graph that is generated by the motor drive controller.

The input value, the detection value, or the computed value of the related information is the current value.

The input value, the detection value, or the computed value of the related information is the maximum value or the minimum value in a certain period.

The graph of the related information is a graph that extends between the minimum value and the maximum value provided to represent the entirety.

The input value, the detection value, or the computed value of the related information is the current value, and the graph of the related information is a graph that is obtained by plotting the input value, the detection value, or the computed value on a line extending between the minimum value and the maximum value provided to represent the entirety.

The input value of the related information is an analog voltage signal, an analog current signal, a pulse signal, or other input signals that are input to the motor drive device.

The detection value of the related information is an output frequency, an output current, an output voltage, or other output signals that represent an operation state of the motor drive device.

When the setting item is a conversion factor such as a gain or an offset, the computed value of the related information is a computed value that represents a conversion result of an input/output signal or an operation state of the motor drive device according to the conversion factor.

Advantageous Effects of Invention

According to the invention, it is possible to provide a motor drive device that can easily and quickly perform setting by using a setting display unit displaying related information required for setting in addition to the setting content.

BRIEF DESCRIPTION OF DRAWINGS

FIG. 5 is a view illustrating a data table.
FIG. 10 is a view illustrating a specific data table.

DESCRIPTION OF EMBODIMENTS

Figure 1:
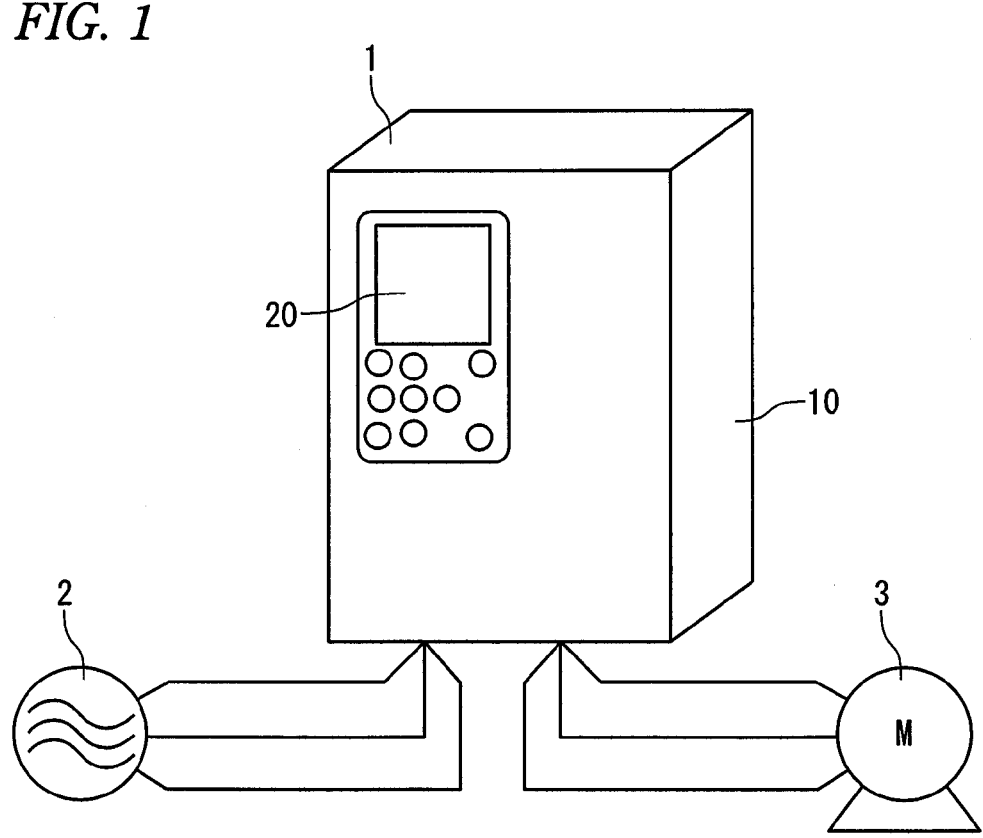
FIG. 1 is a view showing the entire structure of a motor drive system that uses a motor drive device provided with a setting display unit.

Subsequently, a motor drive device according to an embodiment of the invention will be described. First, a motor drive system, which drives a motor by using the motor drive device, will be described. As shown in FIG. 1, the motor drive system includes a motor drive device 1, a power source 2, and a motor 3. The power source 2 and the motor 3 are connected to the motor drive device 1.

The motor drive device 1 has a function of controlling the rotational speed of the motor or the like.

The power source 2 is, for example, a commercial three-phase AC power supply.

The motor 3 is, for example, a three-phase motor.

Subsequently, the detail of the motor drive device 1 will be described. The motor drive device 1 further includes a drive device body 10 and a setting display unit 20. The setting display unit 20 has a shape shown in FIG. 2 as an appearance, and is formed of a handy terminal so that an operator can operate the setting display unit at hand. Further, the setting display unit 20 can be operated while being separated from the drive device body 10, and can be operated by remote control if an extension cable is used.

Figure 3:
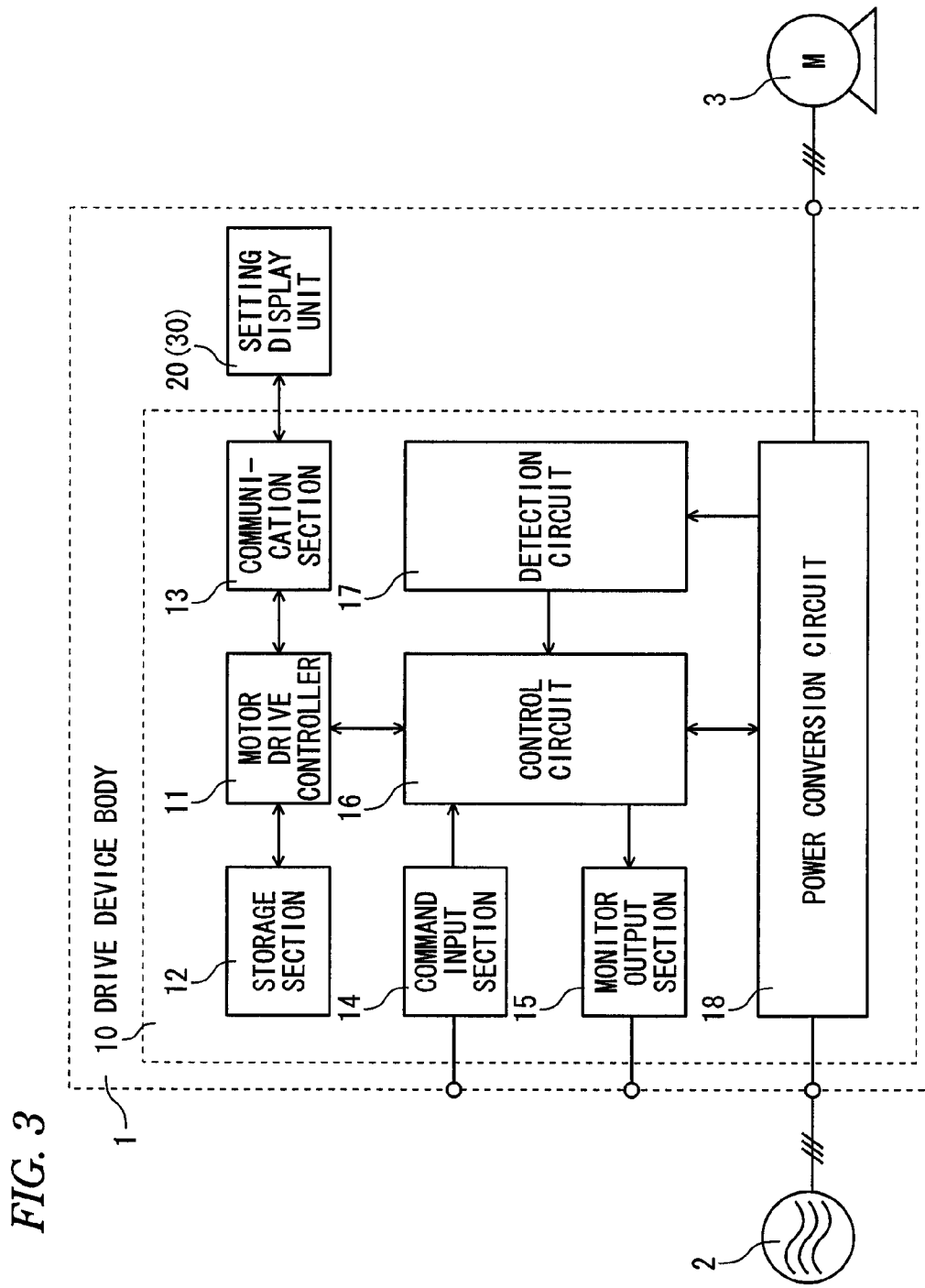
FIG. 3 is a block diagram of the motor drive system.

In detail, as shown in FIG. 3, the drive device body 10 includes a motor drive controller 11, a storage section 12, a communication section 13, a command input section 14, a monitor output section 15, a control circuit 16, a detection circuit 17, and a power conversion circuit 18. The setting display unit 20 and the drive device body 10 are connected to each other for communication.

Figure 4:
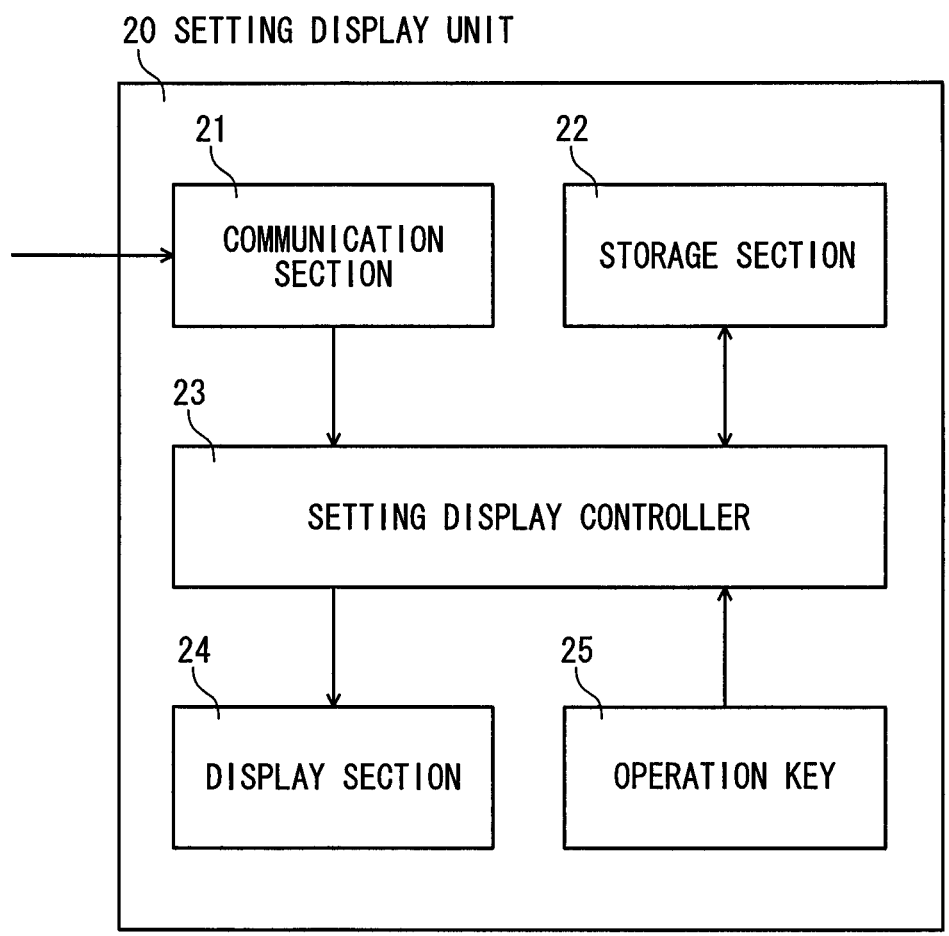
FIG. 4 is a block diagram of the setting display unit.

Further, as shown in FIG. 4, the setting display unit 20 includes a communication section 21, a storage section 22, a setting display controller 23, a display section 24, and an operation key 25. In the motor drive device 1, the motor drive controller 11 of the drive device body 10 and the setting display controller 23 of the setting display unit 20 transmit and receive digital data through the communication sections 13 and 21.

Subsequently, each section will be described. First, each section of the drive device body 10 will be described.

The motor drive controller 11 is a CPU that is connected to the storage section 12, the communication section 13, and the control circuit 16 as shown in FIG. 3, and has a function of controlling the operation of the entire motor drive device 1. An input signal, which is input to the command input section 14, is input to the motor drive controller 11 through the control circuit 16 as an input value that is digital data. Further, a detection signal, which is detected by the detection circuit 17, is input to the motor drive controller 11 through the control circuit 16 as a detection value that is digital data. Furthermore, the motor drive controller 11 outputs a control signal to the power conversion circuit 18 through the control circuit 16. Moreover, the motor drive controller 11 generates a computed value, which is digital data, by computation, generates a graph that is digital drawing data, or performs a series of processing including various kinds of control. The detail of the processing will be described below.

The storage section 12 is a nonvolatile memory, a hard disk, or the like, and stores the setting contents of various setting items as digital data. The setting content of a setting item is related to the operation of the motor drive device 1, and can be changed by a user. Further, the storage section 12 stores an input value that is input from the command input section 14 or a detection value that is sent from the detection circuit 17. Furthermore, the storage section 12 stores a computed value that is computed by the motor drive controller 11.

The communication section 13 has a function of communicating with the communication section 21 of the setting display unit 20, and is provided to communicate with the setting display unit 20. The communication section 13 performs two-way communication by using communication means that is based on, for example, RS-485.

Although described below, the command input section 14 is an input section that is used to input various commands sent from an external device (hereinafter, also referred to as a I2-terminal, a V2-terminal, and a C1-terminal).

Although described below, the monitor output section 15 is an output section that is used to output various states of the motor drive device 10 to an external device.

The control circuit 16 connects the motor drive controller 11 to the other circuits. In particular, the control circuit 16 outputs a control signal that controls the power conversion circuit 18 according to a command sent from the motor drive controller 11.

The detection circuit 17 detects the output current, the output voltage, or similar quantities of the motor drive device 1. For example, the detection circuit 17 converts an output current or an output voltage, which is sent from a current transformer or a transformer installed on the power conversion circuit 18, into a detection value, and outputs the detection value to the control circuit 16.

In particular, the power conversion circuit 18 is a circuit having a function as an inverter. The power source 2 is connected to the input side of the power conversion circuit, and the motor 3 is connected to the output side of the power conversion circuit. A control signal is input to the power conversion circuit 18 from the control circuit 16. The power conversion circuit 18 converts three-phase AC power into AC power, which corresponds to required frequency, voltage, and current, on the basis of this command, and supplies the AC power to the motor 3. The motor 3 is rotationally driven at a predetermined rotational speed. Each section of the drive device body 10 is the same as described above.

Subsequently, the setting display unit 20 will be described. First, each section of the setting display unit 20 will be described.

As shown in FIG. 4, the setting display unit 20 includes the communication section 21, the storage section 22, the setting display controller 23, the display section 24, and the operation key 25.

The communication section 21 communicates with the communication section 13 of the drive device body 10. The communication section 21 employs, for example, an RS-485 system that is the same as the system of the communication section 13 of the drive device body 10. Accordingly, an input value, a detection value, a computed value, a graph, a control signal, and other various data can be transmitted and received by the setting display controller 23 and the motor drive controller 11.

The storage section 22 is a storage medium, such as a nonvolatile memory or a hard disk. A detection value, a computed value, and the like are stored in the storage section 22 by the setting display controller 23.

The setting display controller 23 transmits and receives various data to and from the motor drive controller 11 to perform a series of processing related to setting display. The processing will be described below.

Figure 2:
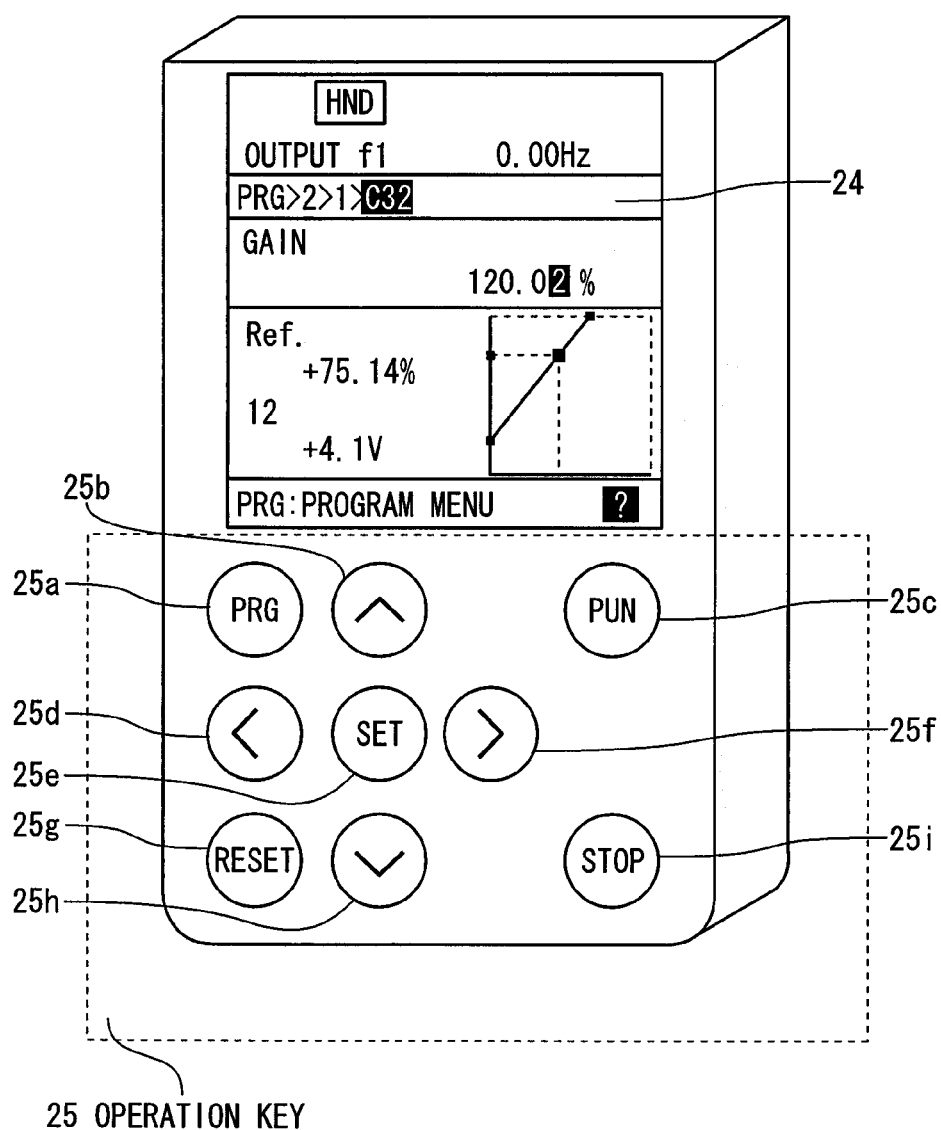
FIG. 2 is a view showing an appearance of the setting display unit.

The display section 24 is, for example, a high-definition display that is formed of one liquid-crystal display (LCD) or the like. As shown in FIG. 2, the display section 24 displays various items. Meanwhile, the display contents will be described below.

As shown in FIG. 2, the operation key 25 includes, for example, a program key 25a, an up key 25b, a run key 25c, a left shift key 25d, a set key 25e, a right shift key 25f, a reset key 25g, a down key 25h, and a stop key 25i. All of the keys are connected to the setting display controller 23, and an input to the setting display controller 23 is performed by pressing of the key. Each section of the setting display unit 20 is the same as described above.

Subsequently, the operation of the setting display unit 20 will be described.

The setting display unit 20 can be operated while being fitted to a storage portion of the drive device body 10 as shown in FIG. 1 and while being separated from the storage portion of the drive device body 10.

Meanwhile, when the setting display unit 20 is fitted into the storage portion of the drive device body 10, the motor drive controller 11 of the drive device body 10 and the setting display controller 23 of the setting display unit 20 are connected to each other by a connector. When the setting display unit 20 is separated from the storage portion of the drive device body 10, the motor drive controller 11 of the drive device body 10 and the setting display controller 23 of the setting display unit 20 are connected to each other by an extension cable. The communication section 13 of the drive device body 10 and the communication section 21 of the setting display unit 20 are electrically connected to each other and can communicate with each other. When an RS-485 system is employed as a communication system as described above, a long cable can be employed. In this case, it is possible to operate the setting display unit 20 while checking the motor 3 or a measuring instrument at a remote location distant from the drive device body 10, or to operate the setting display unit 20 while the setting display unit 20 is mounted on the surface of a control panel.

It is possible to input setting contents to the setting display unit 20 by operating the operation key 25 while checking the setting items and the setting contents displayed on the display section 24. Further, as the characteristics of the invention, the setting display unit 20 can simultaneously display related items and related information that are related to the setting items during an operation for changing the setting contents.

For example, as can be seen from the display section 24 of FIG. 2, the setting content is a value of "120.02%" showing a gain when a setting item is a "gain". Further, when a related item, which is related to a "gain", is "12" showing a 12-terminal of the command input section 14, related information is an input value of "+4.1 V" showing a voltage that is input to the 12-terminal.

These relationships are shown in a data table.

For example, as shown in FIG. 5, related items and related information related to setting items are registered in the data table, and i (i is a natural number) related items and i pieces of related information are registered for a certain setting item. The number "i" is different for each setting content. For example, as shown in FIG. 5, for a setting item 5, i is 2 and two related items are registered. Further, for a setting item 11, i is 3 and three pieces of related information is registered. The setting items, the related items, and related information can be appropriately set as described above. Specifically, as the related information, there are an input value, a detection value, a computed value, and a graph.

The input value is an input value that is input through the command input section 14.

The detection value is a detection value that is detected through the detection circuit 17.

The computed value is a value that is generated using the input value, the detection value, or a set value input from the operation key 25 by the computation of the motor drive controller 11.

The graph is a graph of a linear function that shows a relationship between setting and conversion, and is a graph that shows a value in the range of the minimum value to the maximum value provided to show the entirety thereof. The motor drive controller 11 generates a graph that uses digital drawing data showing a diagram.

Further, as is apparent from FIG. 5, a plurality of input values can be provided as in the related information of a setting item 1.

Furthermore, a plurality of detection values can be provided as in the related information of a setting item 2.

Moreover, a plurality of computed values can be provided as in the related information of a setting item 3.

Further, a plurality of graphs can be provided as in the related information of a setting item 4.

Furthermore, an input value and a detection value can be combined as in the related information of a setting item 5. In this case, one or more input values and one or more detection values can also be combined.

Moreover, an input value and a computed value can be combined as in the related information of a setting item 6. In this case, one or more input values and one or more computed values can also be combined.

Further, an input value and a graph can be combined as in the related information of a setting item 7. In this case, one or more input values and one or more graphs can also be combined.

Furthermore, a detection value and a computed value can be combined as in the related information of a setting item 8. In this case, one or more detection values and one or more computed values can also be combined.

Moreover, a detection value and a graph can be combined as in the related information of a setting item 9. In this case, one or more detection values and one or more graphs can also be combined.

Further, a computed value and a graph can be combined as in the related information of a setting item 10. In this case, one or more computed values and one or more graphs can also be combined.

Further, an input value, a detection value, and a computed value can be combined as in the related information of setting content 11. In this case, one or more input values, one or more detection values, and one or more computed values can also be combined.

Furthermore, an input value, a detection value, and a graph can be combined as in the related information of setting content 12. In this case, one or more input values, one or more detection values, and one or more graphs can also be combined.

Moreover, an input value, a computed value, and a graph can be combined as in the related information of setting content 13. In this case, one or more input values, one or more computed values, and one or more graphs can also be combined.

Further, a detection value, a computed value, and a graph can be combined as in the related information of setting content 14. In this case, one or more detection values, one or more computed values, and one or more graphs can also be combined.

Furthermore, an input value, a detection value, a computed value, and a graph can be combined as in the related information of setting content 15. In this case, one or more input values, one or more detection values, one or more computed values, and one or more graphs can also be combined.

The disposition can be devised to allow these to be displayed on one display section 24 or the display of these can be switched by the operation key 25 or the like so that the number of the pieces of the related information related to one piece of setting content is increased.

Meanwhile, the data table shown in FIG. 5 is one example, and a data table can employ various formats. For example, a data table in which only a setting item and a related item are associated with each other, a data table in which a setting item and setting content are associated with each other, and a data table in which a related item and related content are associated with each other may be registered separately from each other.

Figure 6:
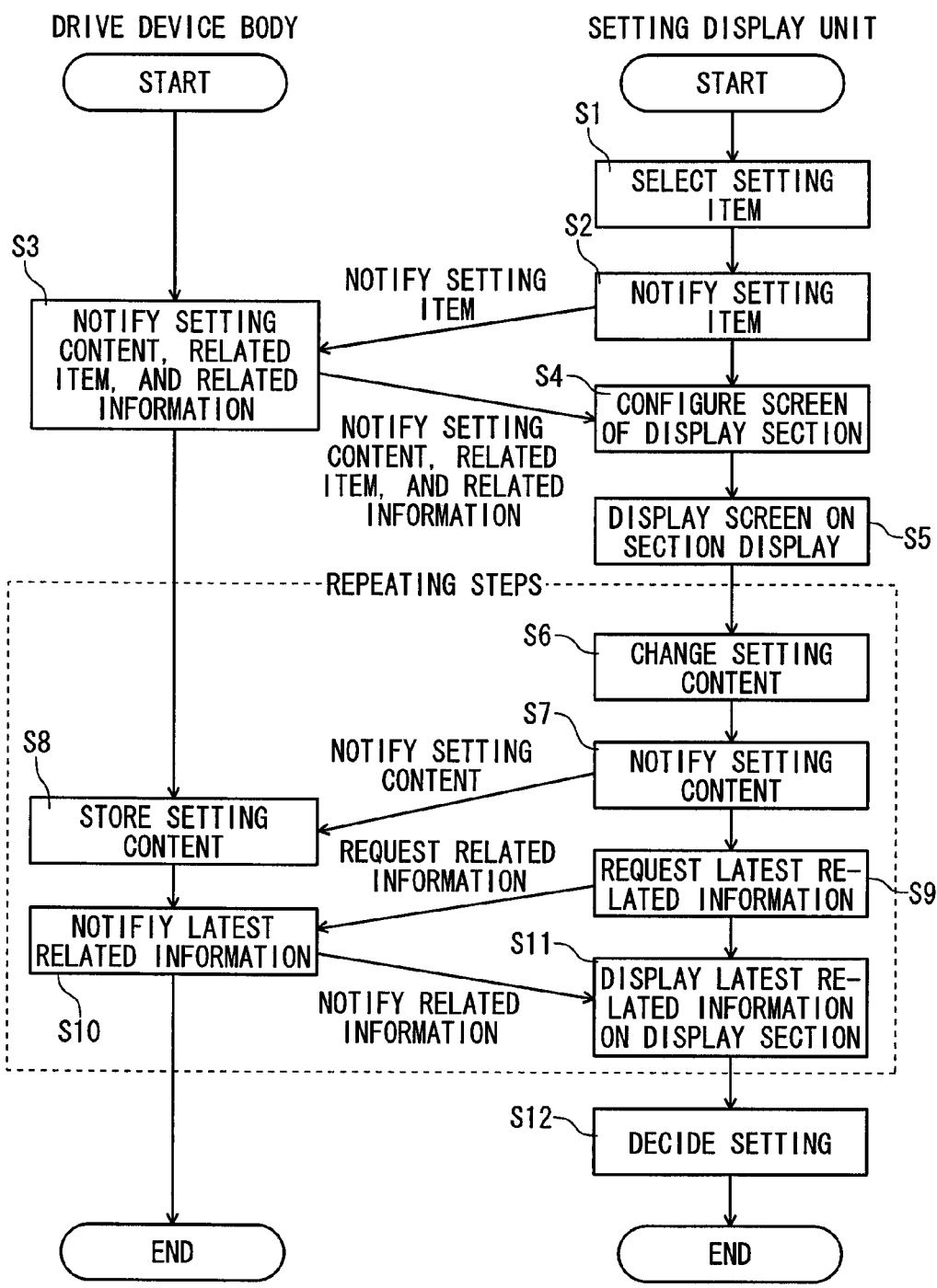
FIG. 6 is a flowchart illustrating setting.

Subsequently, setting using the setting display unit 20 will be described with reference to a flowchart of FIG. 6. FIG. 6 shows general flows that use the drive device body 10 and the setting display unit 20. For example, an example in which the setting content of the setting item 13 of FIG. 5 is set and related information of a related item displays one input value, one computed value, and one graph will be described.

For the specific description, for example, as shown in FIG. 2, there will be described an example in which a "gain" is set as a setting item, a related item is a "voltage signal of the terminal 12", related information is an "input value" thereof, a related item is a "conversion result of the voltage signal of the terminal 12", related information is a "computed value" that is a computation result thereof calculated by conversion, a related item is a "graph showing conversion", and related information displays a "graph" that is digital drawing data thereof.

First, the setting display controller 23 functions as setting item selection means for selecting a setting item according to an operation from the operation key 25 (Step S1). In this case, in order to select a desired setting item, an operator makes the display section 24 sequentially display setting items by operating the up key 25b or the down key 25h of the operation key 25 shown in FIG. 2. When a "gain", which is an intended setting item, is displayed, the operator ends selection. When, for example, the set key 25e is pressed, the setting display controller 23 determines that setting is completed and a selected item is decided.

The setting display controller 23 functions as setting item notification means for notifying the motor drive controller 11 of the selected setting item (Step S2). Data, in which a setting item represents a "gain", is transmitted, so that the motor drive controller 11 is notified of the fact that a setting item is a "gain".

The motor drive controller 11 of the motor drive device 10 functions as notification means for reading setting content, which is registered in association with the setting item, from the storage section 12, reading i related items that are registered in association with the setting item, reading related information about the respective related items, and notifying the setting display controller 23 of the setting content, the i related items, and the i pieces of related information (Step S3).

In this embodiment, the data table is registered in the storage section 12. As shown in the data table of FIG. 5, the related information 1, 2, and 3 of three related items 1, 2, and 3, which are registered in association with the setting item 13, are an input value, a computed value, and a graph, respectively.

In this embodiment, specifically, from the storage section 12, the motor drive controller 11 reads a related item 1 (a voltage signal of the terminal 12), a related item 2 (a conversion result), and a related item 3 (a graph), which are registered in association with the setting item 13 (=gain), and related information 1 (an input value that is a voltage signal of the terminal 12), related information 2 (a computed value that is a conversion result obtained by applying a gain to the voltage signal input value of the terminal 12 and expressed as a percentage), and related information 3 (a graph that is digital drawing data representing characteristics representing the conversion result) that are specific values of the related items 1, 2, and 3.

The setting content of the setting item includes information such as at least the current value (for example, 120.02%) of the setting content, the settable range (for example, 0% to 200%), and the default (for example, 120.00%) of the setting content.

Further, related information, which is displayed by the display section 24, is information in which the related item 1 is the "voltage signal of the terminal 12", the related information 1 is an "input value" thereof (+4.1V), the related item 2 is a "conversion result in which a gain is applied to the voltage signal of the terminal 12", the related information 2 is a "computed value" (+75.14%) that is a computation result thereof, the related item is a "graph showing the conversion", and the related information is a "graph" that is digital drawing data thereof and is shown in FIG. 2.

Returning to FIG. 6, the setting display controller 23 functions as screen configuration means for receiving the setting content, the related item, and the related information from the motor drive controller 11 and configuring a screen to be displayed on the display section 24 (Step S4). The setting display controller 23 determines the layout of a screen by using the setting item, the setting content, the related item, and related information and generates screen data. Data about the layout may be registered in the storage section 22 of the setting display unit 20, and may be read for each setting item. For example, if the setting item is a "gain", a related item 1 (a voltage signal of the terminal 12), a related item 2 (a conversion result), and a related item 3 (a graph), and related information 1 (an input value that is a voltage signal of the terminal 12), related information 2 (a computed value that is a conversion result obtained by applying a gain to the voltage signal input value of the terminal 12 and expressed as a percentage), and related information 3 (a graph that is drawing data representing characteristics representing the conversion result), which are specific values of the related items 1, 2, and 3, are obtained and the layout shown in FIG. 2 may be set.

The setting display controller 23 causes the display section 24 to display a screen on the basis of the generated screen data (Step S5). For example, a screen shown in FIG. 2 is displayed. A user can start changing setting.

Hereinafter, Steps S6 to S11 are steps that continue repeatedly while setting continues to be changed by a user, and are referred to as repeating steps.

The setting display controller 23 functions as setting content change means for performing an operation for changing the setting content of displayed setting item and inputting the change of the setting content (Step S6). For example, the setting display controller 23 performs an operation for the setting content "120.02%" of the setting item "gain" into "120.00%".

The setting display controller 23 functions as setting content notification means for notifying the motor drive controller 11 of the motor drive device 10 of the changed setting content (Step S7). The motor drive controller 11 is notified of the setting content "120.00%".

The motor drive controller 11 of the motor drive device 10 functions as storage means for making the storage section 12 store new setting content (Step S8). Further, the motor drive controller 11 transmits a control signal, which changes the setting content into this new setting content, to the power conversion circuit 18 through the control circuit 16 by a control program executed in another process. The power conversion circuit 18 performs the motor rotation control, in which a gain is changed, of the motor 3.

The setting display controller 23 functions as related information request means for requesting the motor drive controller 11 to perform the notification of the latest related information that is changed according to the changed setting content (Step S9). Further, the motor drive controller 11 functions as related information notification means for making the notification of the latest related information (Step S10). Furthermore, the setting display controller 23 functions as display means for displaying the latest related information on the display section 24 (Step S11).

Processing of Steps S9 to S11 about the related items 1, 2, and 3 will be performed, for example, as follows:

The motor drive controller 11 reads an input value. The terminal 12 is the command input section 14, and an input value input from the command input section 14 is input to the motor drive controller 11 through the control circuit 16. The motor drive controller 11 transmits the input value to the setting display controller 23 through the communication sections 13 and 21. The setting display controller 23 displays the input value on the display section 24. As shown in FIG. 3, the voltage of the terminal 12 is displayed as +4.1 V.

Further, the motor drive controller 11 calculates a computed value. The motor drive controller 11 transmits the computed value to the setting display controller 23 through the communication sections 13 and 21. The setting display controller 23 displays the computed value on the display section 24. When, for example, the voltage of the terminal 12 is an input value of +4.1 V, the computed value is regarded as a command of 75.14%. This 75.14% is a computed value that is computed by a predetermined method. As shown in FIG. 3, the computed value is displayed as 75.14%.

Further, the motor drive controller 11 calculates a graph by using a detection value or a computed value. The motor drive controller 11 transmits the graph to the setting display controller 23 through the communication sections 13 and 21. The setting display controller 23 displays the graph on the display section 24. The graph is, for example, a graph of a linear function that shows a relationship between a certain detection value and a computed value that is to be calculated. In particular, a black spot is drawn at a position that corresponds to a computed value of 75.14%. When the computed value approaches 0%, the black spot moves downward on the graph. When the computed value approaches 100%, the black spot moves upward on the graph.

Meanwhile, the detection value, the computed value, and the graph are sequentially displayed at a high speed, but an operator feels as if the detection value, the computed value, and the graph are simultaneously displayed.

The operator checks the related information, and performs the repeating steps again if the operator determines that intended characteristics are not obtained. Until the intended result is obtained by the change of a set value of the setting item, the operator operates the operation key 25 and repeats an operation for changing a set value while paying attention to the related information. A new detection value, a new computed value, and a new graph are sequentially displayed according to new setting.

An operator changes the setting content of the setting item and checks the related information of a related item in the same manner as described above, and ends setting when the intended result is obtained (when, for example, the conversion result of the related item 2 reaches a predetermined value). The setting display controller 23 functions as decision means for deciding the setting content by the operation of the operation key 25 that is performed by a user (Step S12).

While referring to the latest related information about an item set by a user oneself, the operation display 10 can set an optimum value by updating the related information that is displayed on a screen at any time as described above.

Figure 7:
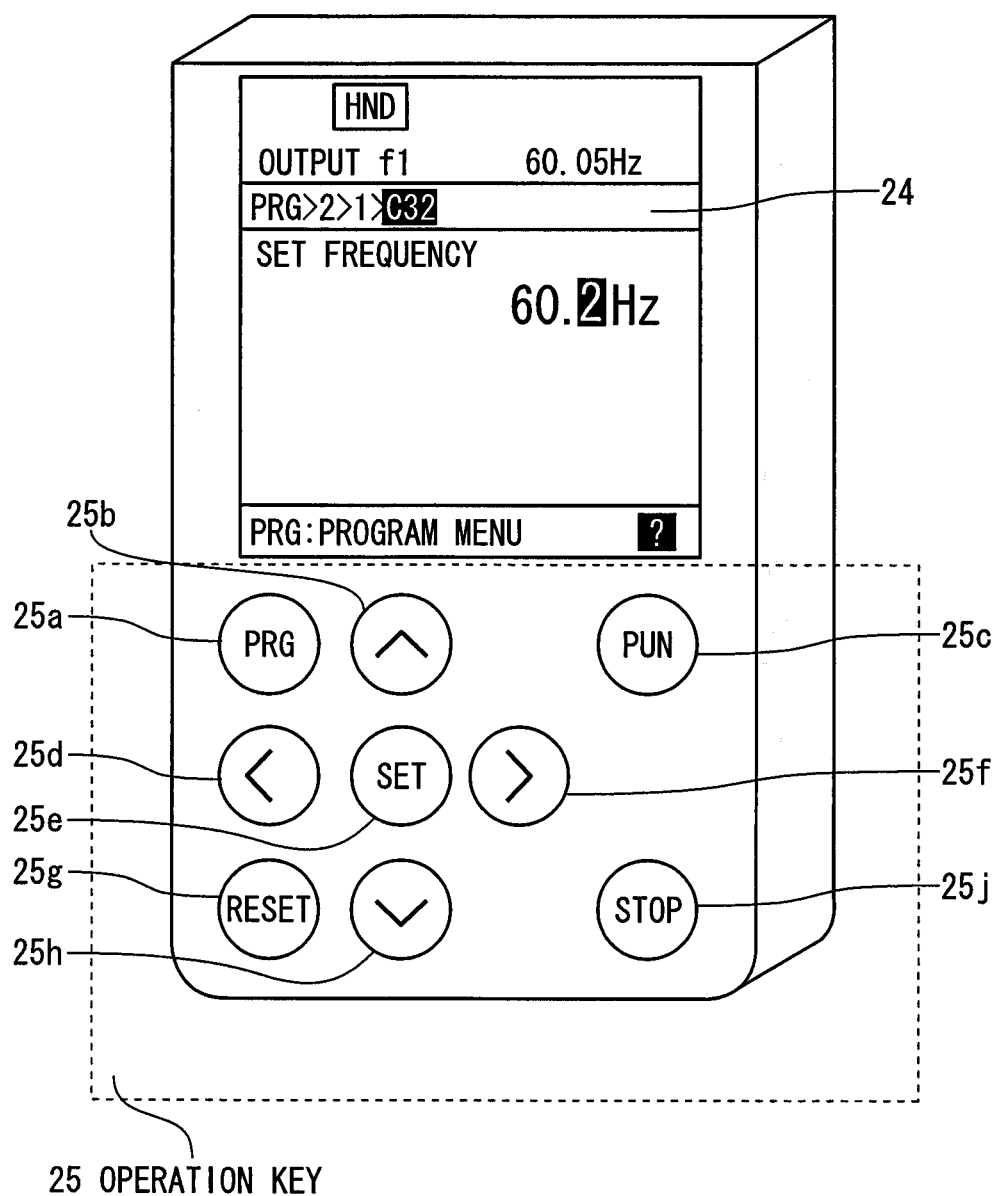
FIG. 7 is a view illustrating an example of setting display.

Subsequently, there will be described an example in which a detection value is used as related information, that is, an example in which an output frequency is set as setting content after the setting of a gain and the output frequency (detection value) of an inverter is referred as related information. For example, display shown in FIG. 7 is made.

An operator operates the operation key 25 to set an intended set frequency. The operator designates a digit (a portion displayed by white), which is to be changed, by the left shift key 25$d$ or the right shift key 25$f$. Further, until an intended number appears, the operator changes a number by the up key 25$b$ or the down key 25$h$. Furthermore, when an intended number appears, the operator moves a cursor to a digit, which is to be set next, by the left shift key 25$d$ or the right shift key 25$f$. The operator sets an intended set frequency "60.2 Hz" by repeating these operations. The operator decides the intended set frequency by pressing the set key 25$e$ after ending the setting (Step S6).

The setting display controller 23 transmits an output frequency, which is digital data representing the setting content, to the motor drive controller 11 (Step S7). The motor drive controller 11 stores the setting content (Step S8). Further, the motor drive controller 11 transmits a control signal, which corresponds to the setting content, to the power conversion circuit 18 through the control circuit 16 by a control program executed in another process. The power conversion circuit 18 performs the motor rotation control, in which a set frequency is changed, on the motor 3.

Furthermore, the detection circuit 17 converts the detection signal, which is sent from the power conversion circuit 18, into a detection value, and the detection value is input to the motor drive controller 11 through the control circuit 19. Moreover, the setting display controller 23 requests the motor drive controller 11 to perform the notification of the detection value (Step S9). The motor drive controller 11 transmits the detection value to the setting display controller 23 according to this request (Step S10). The setting display controller 23 controls the display section 24 to display the detection value (Step S11). The setting display controller 23 controls the display section 24, and the display section 24 displays an output frequency "60.05 Hz" of the power conversion circuit 18 as shown in FIG. 7.

Detection values that are new related information corresponding to the new setting contents (set frequencies) (output frequencies sent from the power conversion circuit 18) are sequentially displayed in this manner. Further, if an operator checking these detection values determines that intended characteristics are not obtained, the operator changes the setting content of the setting item again. As described above, an operator determines whether or not an intended value is obtained, while checking the detection value. If change is required, the operator further changes the setting content of the setting item. An operator changes the set value of the setting item and checks the related information of a related item in the same manner as described above, and ends setting when the intended characteristics are obtained. Working is performed in this manner.

According to this embodiment, it is possible to provide the setting display unit that simultaneously displays the related information of at least one or more related items at positions close to each other on the display section 24 in addition to the setting content of the setting item and easily and quickly adjusts the various setting contents while checking the change of related information, and the motor drive device that is easily set by the setting display unit.

Figure 8:
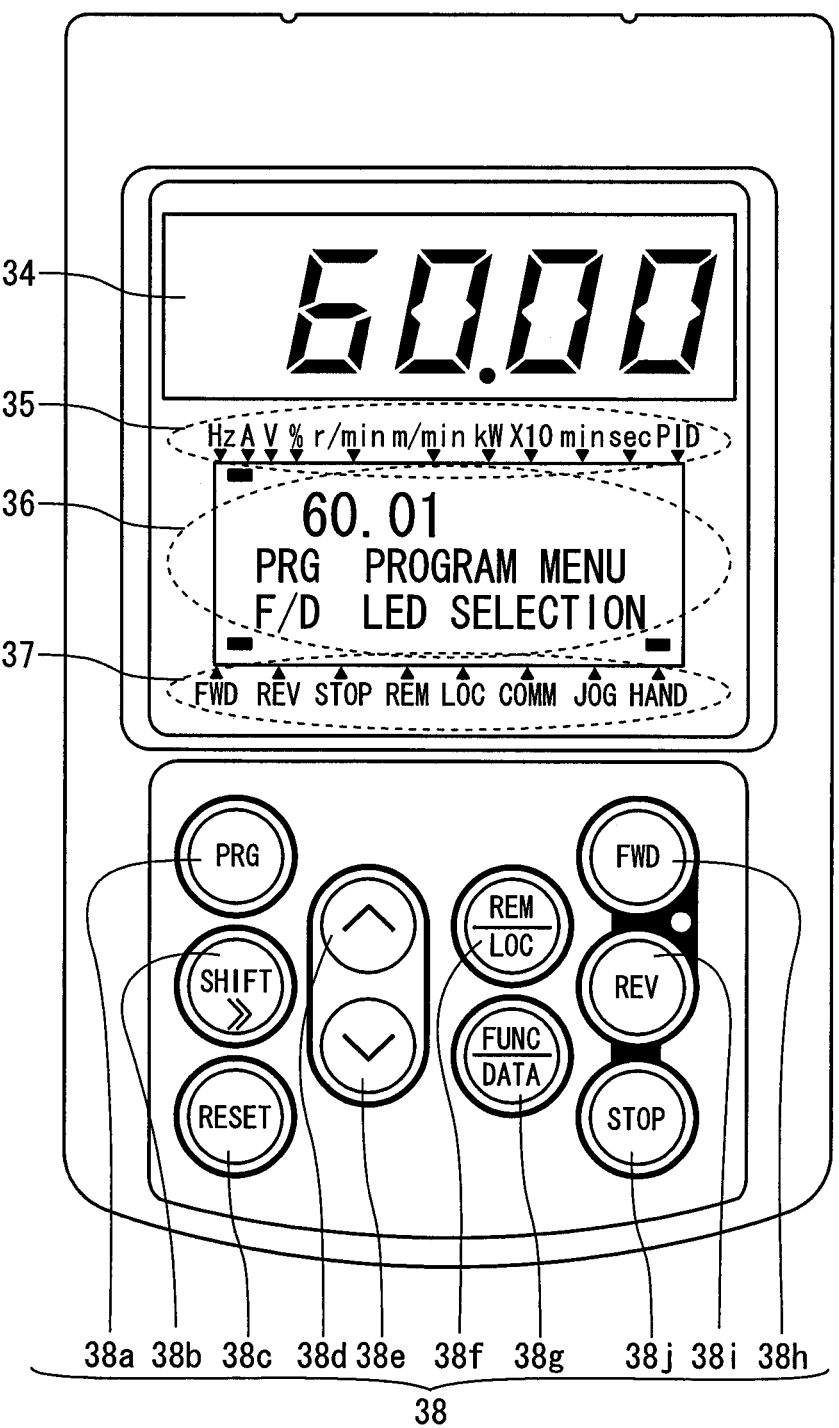
FIG. 8 is a view showing the appearance of a setting display unit of another embodiment.
Figure 9:
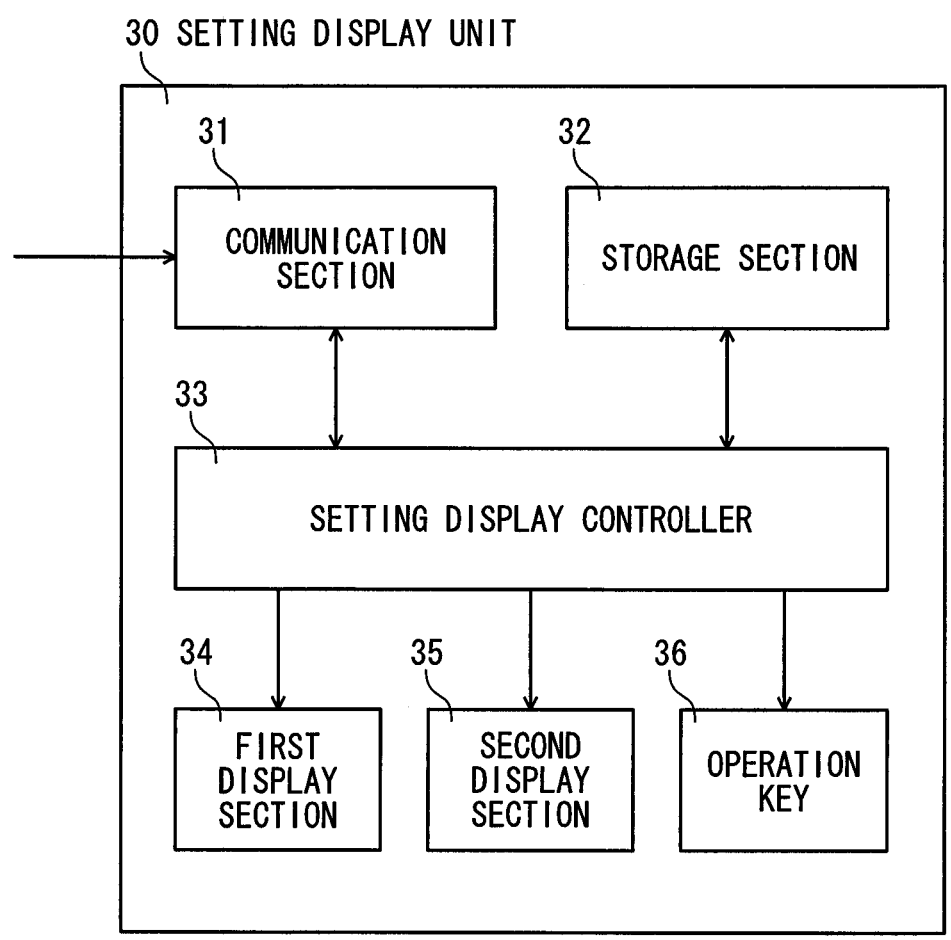
FIG. 9 is a block diagram of the setting display unit of another embodiment.

Subsequently, another embodiment will be described. A motor drive device according to this embodiment is different from the previous embodiment in that a setting display unit 30 shown in FIGS. 8 and 9 is used instead of the setting display unit 20. The setting display unit 30 of this embodiment is characterized in that two display sections, that is, first and second display sections 34 and 36 are provided as a display section. Meanwhile, the setting display unit 30 is configured to set the drive device body 10 as shown in FIG. 3. Since the description of the drive device body 10 is the same as described above, the repeated description will be omitted. The setting display unit 30 will be described below.

As shown in FIGS. 8 and 9, the setting display unit 30 includes a communication section 31, a storage section 32, a setting display controller 33, a first display section 34, a unit indicator 35 for the first display section, a second display section 36, a unit indicator 37 for the second display section, and an operation key 38. The setting display unit 30 has an appearance shown in FIG. 8. The first display section 34, the unit indicator 35 for the first display section, the second display section 36, and the unit indicator 37 for the second display section are disposed so as to be lined up from above.

The communication section 31 communicates with the communication section 13 of the drive device body 10. The communication section 31 employs an RS-485 system that is the same as the system of the communication section 13 of the drive device body 10. Accordingly, an input value, a detection value, a computed value, a graph, a control signal, and other various data can be transmitted and received by the setting display controller 33 and the motor drive controller 11.

The storage section 32 is a storage medium, such as a nonvolatile memory or a hard disk. A detection value and a computed value are stored in the storage section 32 by the setting display controller 33.

The setting display controller 33 transmits and receives various data to and from the motor drive controller 11 to perform a series of processing related to setting display. The processing will be described below.

The first display section 34 is a 5-Digit 7-Segment LED. Accordingly, the first display section 34 displays a set value among the setting contents of a setting item or a detection value or a computed value of the related information of a related item, as a number. A set frequency (60 Hz), which is one of the setting contents, is shown in FIG. 8.

The unit indicator 35 for the first display section is positioned below the first display section 34, and shows a plurality of units that are to be taken by the first display section 34. The unit indicator 35 for the first display section is generally formed by printing. A unit, which is taken, is indicated by an underline of the second display section 36. Hz is selected in FIG. 8.

The second display section 36 is a high-definition liquid-crystal display. Accordingly, the second display section 36 can particularly display a graph or letters in addition to a set value among the setting contents of a setting item or a detection value or a computed value of the related information of a related item. Letters of "program menu" are shown in FIG. 8. In this embodiment, the second display section 36 is disposed below the first display section 34.

The unit indicator 37 for the second display section is positioned below the second display section 36, and shows various states that are to be taken in the second display section 36 by the motor drive device. The unit indicator 37 for the second display section is generally formed by printing. States, which are provided, are indicated by underlines of the second display section 36. FWD that represents the forward rotation of the motor 3, and HAND that represents an operation from the setting display unit 30 are shown in FIG. 8.

The operation key 38 further includes a program key 38a, a shift key 38b, a reset key 38c, an up key 38d, a down key 38e, a remote/local key 38f, a function data key 38g, a forward rotation key 38h, a reverse rotation key 38i, and stop key 38j, as typical keys. All of the keys are connected to the setting display controller 33, and an input to the setting display controller 33 is performed by pressing of the key. Each section of the setting display unit 30 is the same as described above.

Subsequently, an example in which a set frequency is set and an output frequency of an inverter is referenced as related information will be described. As shown in FIG. 8, an operator operates the operation key 38 to set an intended set frequency. The first display section 34 is used in this setting. The operator designates a digit, which is to be changed, by the shift key 38b. The designated digit is displayed so as to flicker. Further, a value is changed, but the operator changes a number by the up key 38d or the down key 38e until an intended number appears. Furthermore, when an intended number appears, the operator moves a cursor to a digit, which is to be set next, by the shift key 38b. The operator sets an intended set frequency "60.00" by repeating these operations. The operator ends the flickering state and decides the intended set frequency by pressing the shift key 38b after ending the setting.

The setting display controller 33 receives an input from the operation key 38, and transmits the setting content, which is digital data, to the motor drive controller 11. The motor drive controller 11 controls the power conversion circuit 18 through the control circuit 16, and the power conversion circuit 18 performs the motor rotation control, in which an output frequency is changed, of the motor 3.

Further, the operator checks the output frequency. The second display section 36 is used in this check. The output frequency, which is a detection value sent from the detection circuit 17, is input to the motor drive controller 11 through the control circuit 16. When the setting display controller 33 performs the request of the latest related information, the motor drive controller 11 notifies the setting display controller 33 of the output frequency. The setting display controller 33 controls the second display section 36 to display the output frequency. As shown in FIG. 8, the second display section 36 displays an output frequency "60.01" of the power conversion circuit 18.

New detection values corresponding to the new setting contents (set frequencies) (output frequencies sent from the power conversion circuit 18) are sequentially displayed in this way. Further, if an operator checking these detection values determines that intended characteristics are not obtained, the operator changes the setting content of the setting item again. An operator changes the setting content of the setting item and checks the related information of a related item in the same manner as described above, and ends setting when the intended characteristics are obtained. Working is performed in this manner.

Meanwhile, the setting display unit 30 is the same as the above-mentioned setting display unit 20 except that, particularly, the setting contents are displayed by two display sections, and various kinds of setting can be performed according to the above-mentioned flow. Accordingly, the repeated description will be omitted.

Even in the setting display unit 30, the setting contents of the setting items and the related information of the related items can be displayed as in the above-mentioned setting display unit 20. The same operation is performed, but the setting contents or related information corresponding to a numerical value are displayed by the first display section 34 that is a 7-Segment LED, and the setting contents or related information corresponding to a numerical value, letters, and a figure are displayed on the second display section 36 by a high-definition liquid-crystal display. Accordingly, an operator easily checks the setting contents and it is possible to reduce the risk of erroneous setting and the time that is required for setting. Further, since the 7-Segment LED is easily programmed, the 7-Segment LED can display objects at a high speed. Accordingly, it is possible to quickly display objects as compared to, for example, a case in which all objects are displayed by a high-definition liquid-crystal display. Therefore, there are advantages in that values detected in real time are easily detected and an operator can reliably recognize a situation and easily understand the situation.

Example 1

Subsequently, more specific Example 1 of a setting item and a related item will be described. The motor drive device 1 including the setting display unit 20, which has been described with reference to FIGS. 1 to 7, is used in this example. FIG. 10 is a view illustrating a specific data table. The setting item of Example 1 is the current limitation of an output current (operational level) of the motor drive device 1, and is "F44: current limitation (operational level)". "F44" is a setting item number of the setting item. "Current limitation (operational level)" is a setting item name of the setting item. Further, a related item 1 is an "output current value (%)", and related information is the computed value thereof. Furthermore, a related item 2 is "output current (A)", and related information is the detection value thereof. Moreover, other related items are also displayed. Here, the output current (A) is a detection value that is detected by the detection circuit 17, and the output current value (%) is a computed value that is computed on the basis of the output current (A) by the motor drive controller 11.

Figure 11:
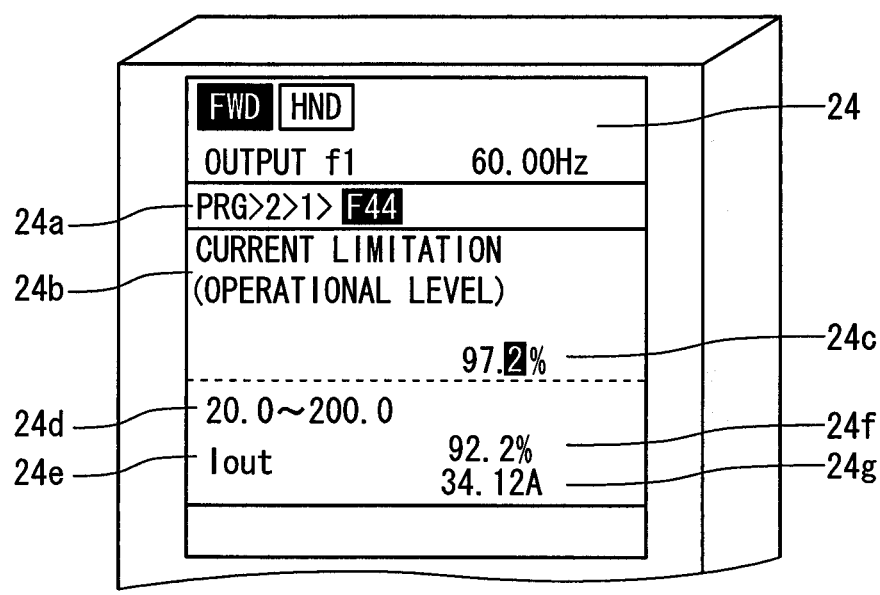
FIG. 11 is a view showing a display section of a setting display unit according to Example 1.

FIG. 11 is a view showing the display of the setting display unit. The display section 24 displays "F44" as the setting item number 24a of the setting item. Further, the display section 24 displays "current limitation (operational level)" as the setting item name 24b of the setting item.

Furthermore, the display section 24 displays a specific numerical value ("97.2%" in FIG. 11) of "current limitation (operational level)" that is the setting content 24c of the setting item.

Moreover, the display section 24 displays a specific numerical value ("20.0 to 200.0" in FIG. 11) as a change range 24d of the related information of another related item.

Further, the display section 24 displays "Iout" as related item names 24e of the related items 1 and 2.

Furthermore, the display section 24 displays a specific numerical value ("92.2%" in FIG. 11) as "output current (%)" that is a detection value 24f of the related information of the related item 1.

Moreover, the display section 24 displays a specific numerical value ("34.12 A" in FIG. 11) as "output current (A)" that is a converted value 24g of the related information of the related item 2.

Subsequently, the setting of the setting display unit 20 and the operation of the motor drive device 1 will be described.

First, an operator selects a setting item by pressing the up key 25b or the down key 25h, and ends selection when "F44" or "current limitation (operational level)" is displayed on the display section 24. For example, when the set key 25e is pressed, the setting display controller 23 decides the setting item.

Subsequently, the setting display controller 23 reads the setting content, the related item, and the related information, which are registered in association with this setting item, from the storage section 12 through the communication section 21, the communication section 13, and the motor drive controller 11. Data representing "output current value (%)" and "output current (A)" are read as related items, and the related items are decided. In this case, data representing the change range (20.0 to 200.0) or the related item name (Iout) are read as related information, and are displayed on the display section 24.

Further, the setting display controller 23 displays a specific current numerical value of "current limitation (operational level)" of the setting item on the display section 24. For example, "97.2%" is displayed as shown in FIG. 11.

Furthermore, the setting display controller 23 displays specific numerical values of the current "output current value (%)" and the current "output current (A)" on the display section 24. For example, "92.2%" and "34.12 A" are displayed as shown in FIG. 11. The output current value (%)" and "output current (A)" are read from the motor drive controller 11 in every predetermined period, and display is updated so that the latest related information is displayed.

Subsequently, the setting content is changed.

An operator increases or decreases "current limitation (operational level)" by pressing the up key 25b or the down key 25h. Then, the setting display controller 23 increases or decreases "current limitation (operational level)" that is currently set, and displays the increased or decreased current limitation (operational level) on the display section 24. For example, "97.5%" is displayed.

Subsequently, the setting display controller 23 reads "output current (A)", which is a detection value affected by the change of "current limitation (operational level)" and is the current detection value, and "output current value (%)", which is the current computed value converted using the current "output current (A)", from the motor drive controller 11 of the drive device body 10. The setting display controller 23 displays the current "output current value (%)" and the current "output current (A)" on the display section 24. For example, "92.5%" and "34.15 A" are displayed.

The same operation as described above is performed until an output intended by an operator appears.

As described above, "output current value (%)" and "output current (A)", which are related information, are simultaneously displayed on the display section 24 of the setting display unit 20 in real time according to the change of the output of the motor drive device 1 that is affected by the setting performed by the setting display unit 20. Accordingly, while instantly checking "output current value (%)" and "output current (A)", it is possible to perform setting so that an output becomes optimum. Therefore, setting becomes very easy.

Example 2

Subsequently, more specific Example 2 of a setting item and a related item will be described. The motor drive device 1 including the setting display unit 20, which has been described with reference to FIGS. 1 to 7, is used in this example. The setting item of Example 2 is an excessive-deflection alarm level of a PID controller, which is built in the control circuit 16 of the motor drive device 1, of the data table shown in FIG. 10, and is "J1-22:P1D1 (upper limit alarm AH)". "J1-22" is a setting item number of the setting item. "P1 D1 (upper limit alarm AH)" is a setting item name of the setting item. Further, a related item 1 is "the current PID feedback value (MPa)", and related information is a detection value thereof. Furthermore, related item 2 is "numerical value data of the deflection between a PID process command and a PID feedback value", and related information is the computed value thereof. The numerical value data of deflection is a computed value that is calculated on the basis of the PID process command and the PID feedback value through computation by the motor drive controller 11.

Figure 12:
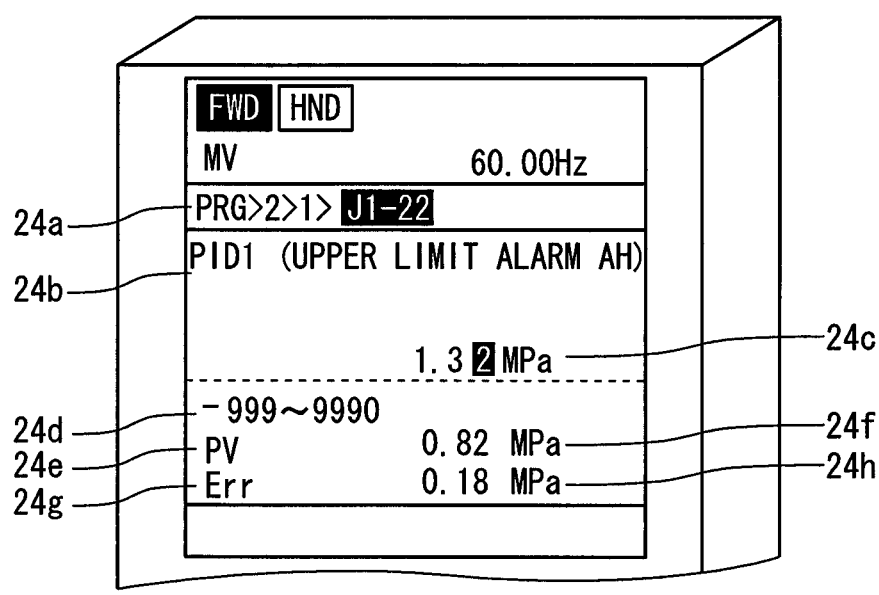
FIG. 12 is a view showing a display section of a setting display unit according to Example 2.

FIG. 12 is a view showing the display of the setting display unit. The display section 24 displays "J1-22" as the setting item number 24a of the setting item. Further, the display section 24 displays "P1D1 (upper limit alarm AH)" as the setting item name 24b of the setting item.

Furthermore, the display section 24 displays a specific numerical value ("1.32 MPa" in FIG. 12) of "P1D1 (upper limit alarm AH)" that is the setting content 24c of the setting item.

Moreover, the display section 24 displays a specific numerical value ("−999 to 9990" in FIG. 12) as a change range 24d of the related information of another related item.

Further, the display section 24 displays "PV" as a related item name 24e of the related item 1.

Furthermore, the display section 24 displays a specific numerical value ("0.82 MPa" in FIG. 12) as "the current PID feedback value (MPa)" that is a detection value 24f of the related information of the related item 1.

Moreover, the display section 24 displays "Err" as a related item name 24g of a related item 2.

Further, the display section 24 displays a specific numerical value ("0.18 MPa" in FIG. 12) as the "numerical value data of the deflection between a PID process command and a PID feedback value" that is a computed value 24h of the related information of the related item 2.

Subsequently, the setting of the setting display unit 20 and the operation of the motor drive device 1 will be described.

First, an operator selects a setting item by pressing the up key 25b or the down key 25h, and ends selection when "J1-22" or "current control P1D1 (upper limit alarm AH)" is displayed on the display section 24. For example, when the set key 25e is pressed, the setting display controller 23 decides the setting item.

Subsequently, the setting display controller 23 reads the setting content, the related item, and the related information, which are registered in association with this setting item, from the storage section 12 through the communication section 21, the communication section 13, and the motor drive controller 11. Data representing "the current PID feedback value (MPa)" and the "numerical value data of the deflection between a PID process command and a PID feedback value" are read as related items, and the related items are decided. In this case, data representing the change range (−999 to 9990) and the related item names (PV) and (Err) are read as related information, and are displayed on the display section 24.

Further, the setting display controller 23 displays a specific numerical value, which is the setting content of the "P1 D1 (upper limit alarm AH)" of the setting item, on the display section 24. For example, "1.32 MPa" is displayed as shown in FIG. 12.

Furthermore, the setting display controller 23 displays the specific numerical values of "the current PID feedback value (MPa)" and the "numerical value data of the deflection between a PID process command and a PID feedback value" on the display section 24.

Meanwhile, the "numerical value data of the deflection between a PID process command and a PID feedback value" is a computed value that is obtained, when the motor drive controller 11 of the drive device body 10 obtains "the current output PID feedback value (MPa)" from the detection circuit 17, by the computation using this detection value. As shown in FIG. 12, for example, "0.82 MPa" and "0.18 MPa" are displayed as the specific numerical values of "the current PID feedback value (MPa)" and the "numerical value data of the deflection between a PID process command and a PID feedback value". "The current PID feedback value (MPa)" and the "numerical value data of the deflection between a PID process command and a PID feedback value" are read from the motor drive controller 11 in every predetermined period, and display is updated so that the latest related information is displayed.

Subsequently, the setting content is changed.

An operator increases or decreases "P1D1 (upper limit alarm AH)" by pressing the up key 25b or the down key 25h. Then, the setting display controller 23 increases or decreases the "P1D1 (upper limit alarm AH)" from "1.32 MPa" of the "P1D1 (upper limit alarm AH)", which is currently set, and displays the increased or decreased "P1D1 (upper limit alarm AH)" on the display section 24. For example, "1.34 MPa" is displayed.

Subsequently, the setting display controller 23 reads the current "output PID feedback value (MPa)", which is a detection value affected by the change of the "P1D1 (upper limit alarm AH)", from the motor drive controller 11 of the drive device body 10, and reads the current "deflection between a PID process command and a PID feedback value", which is computed using this detection value by the motor drive controller 11, from the motor drive controller 11 of the drive device body 10. The setting display controller 23 displays the current "output PID feedback value (MPa)" and the current "numerical value data of the deflection between a PID process command and a PID feedback value" on the display section 24. For example, "0.84 MPa" and "0.19 MPa" are displayed.

The same operation as described above is performed until an output intended by an operator appears.

As described above, "the current output PID feedback value (MPa)" and the "numerical value data of the deflection between a PID process command and a PID feedback value", which are related information, are simultaneously displayed on the display section of the setting display unit in real time according to the change of the output of the motor drive device 1 that is affected by setting. Accordingly, while instantly checking a "feedback value (MPa)" and "deflection", it is possible to perform setting so that an output becomes optimum. Therefore, setting becomes very easy.

Example 3

Figure 13:
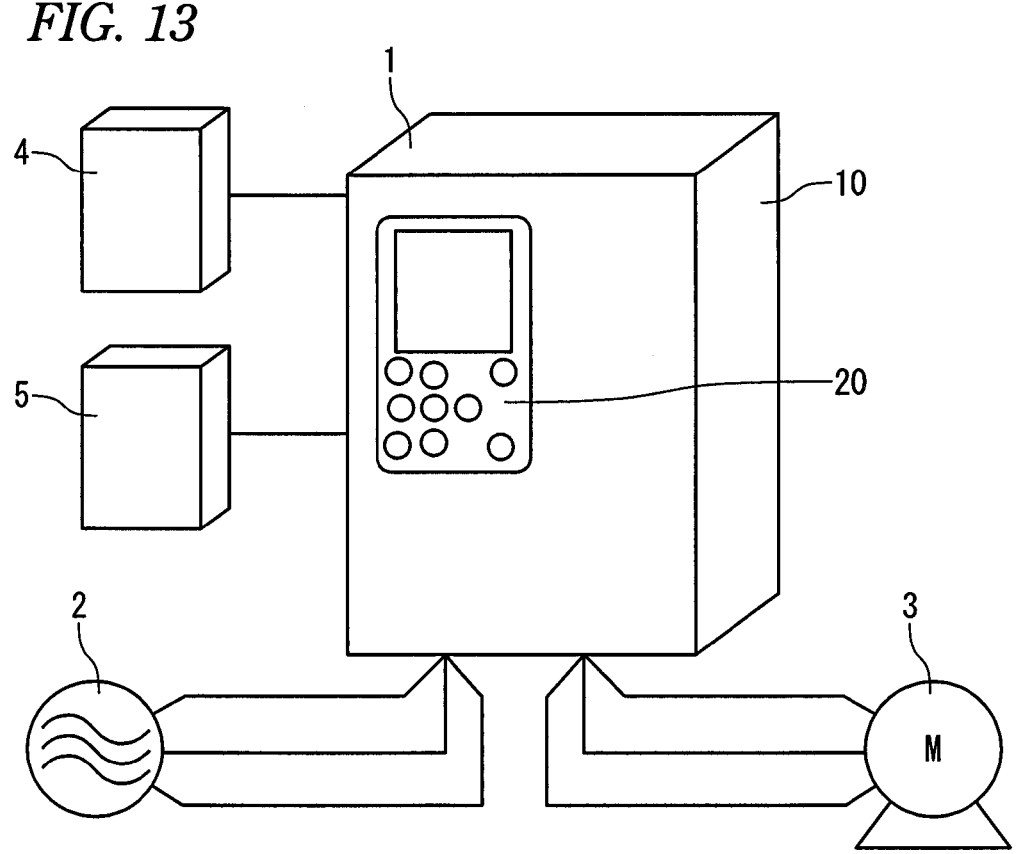
FIG. 13 is a view showing the entire structure of a motor drive system according to Example 3.
Figure 14:
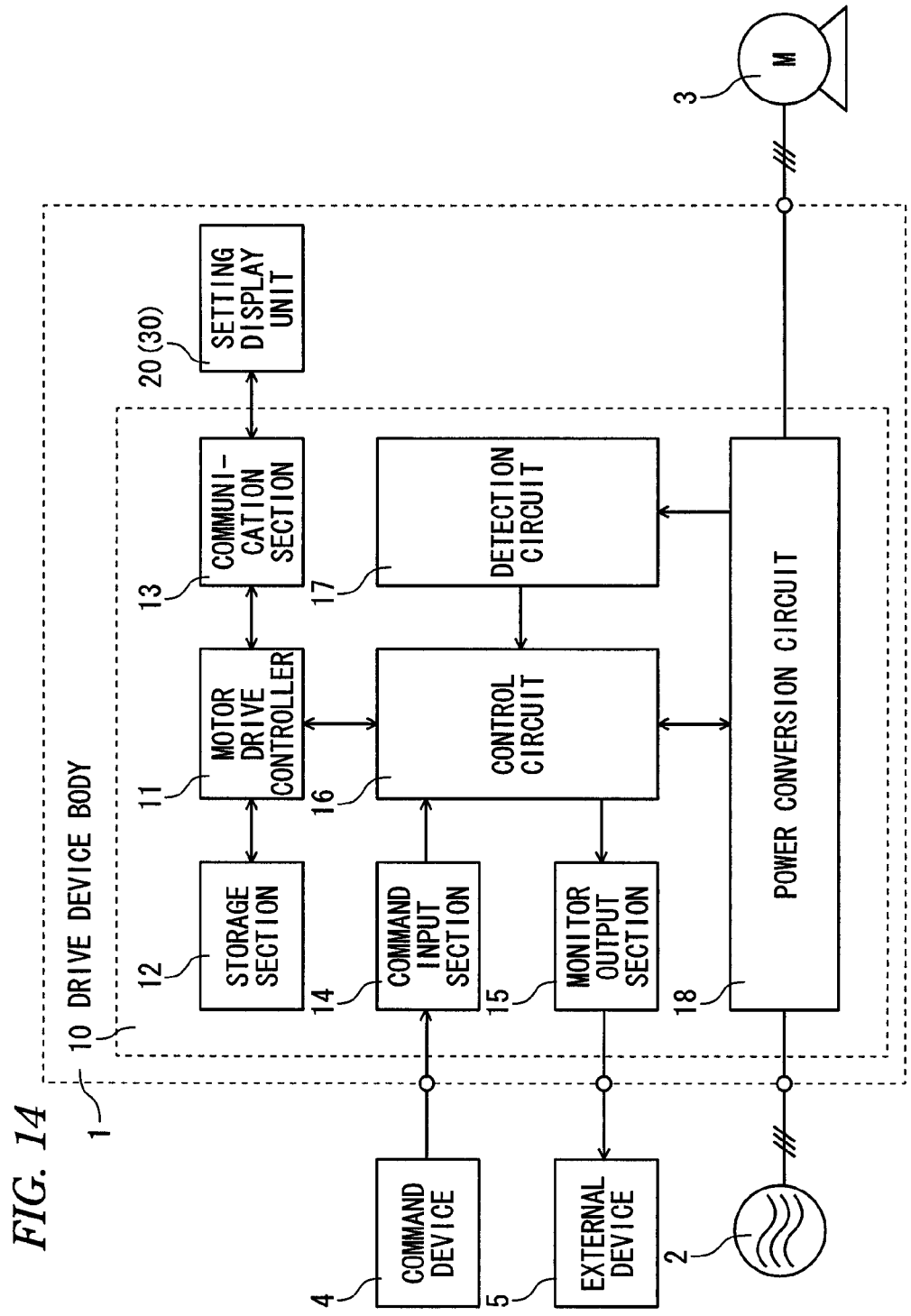
FIG. 14 is a block diagram of the motor drive system according to Example 3.

Subsequently, more specific Example 3 of a setting item and a related item will be described. In this example, external devices are connected to the setting display unit 20 that has been described with reference to FIGS. 1 to 7. In addition, as shown in FIGS. 13 and 14, a command device 4 is connected to the command input section 14 and various commands are input to the command input section 14. Further, an external device 5 is connected to the monitor output section 17 and the monitor output section 15 outputs a monitoring signal to the outside.

The setting item of Example 3 is a conversion factor used to convert an analog voltage signal, which is input to the motor drive device, of the data table shown in FIG. 10 into an internal command value, and is "C32: 12-terminal (gain)". "C32" is a setting item number of the setting item. "12-terminal (gain)" is a setting item name of the setting item. Further, a related item 1 is a "12-terminal input voltage (V)", and related information is the actual input value thereof. Furthermore, related item 2 is an "inside amount (%) after conversion", and related information is a computed value that is calculated using not only an input value but also the "12-terminal input voltage (V)".

Figure 15:
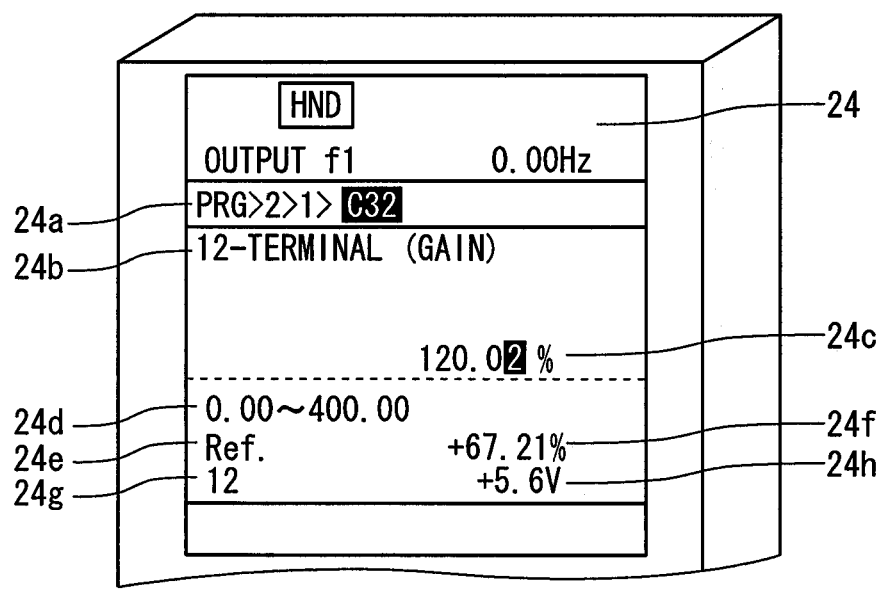
FIG. 15 is a view showing a display section of a setting display unit according to Example 3.

FIG. 15 is a view showing the display of the setting display unit. The display section 24 displays "C32" as the setting item number 24a of the setting item. Further, the display section 24 displays "12-terminal (gain)" as the setting item name 24b of the setting item.

Furthermore, the display section 24 displays a specific numerical value (120.02% in FIG. 15) as an "inside amount (%) after conversion" that is the setting content 24c of the setting item.

Moreover, the display section 24 displays a specific numerical value (0.00 to 400.00 in FIG. 15) as a change range 24d of the related information of the related item 1.

Further, the display section 24 displays "Ref" as a related item name 24e of the related information of the related item 1.

Furthermore, the display section 24 displays a specific numerical value (+67.21% in FIG. 15) as the "inside amount (%) after conversion" that is a computed value 24f of the related information of the related item 1.

Moreover, the display section 24 displays "12" as a related item name 24g of related information of the related item 2.

Further, the display section 24 displays a specific numerical value (+5.6 V in FIG. 15) as the "12-terminal input voltage (V)" that is a detection value 24h of the related information of the related item 2.

Subsequently, the setting of the setting display unit 20 and the operation of the motor drive device 1 will be described.

First, an operator selects a setting item by pressing the up key 25b or the down key 25h, and ends selection when "C32" and "12-terminal input (gain)" are displayed on the display section 24. For example, when the set key 25e is pressed, the setting display controller 23 decides the setting item.

Subsequently, the setting display controller 23 reads the setting content, the related item, and the related information, which are registered in association with this setting item, from the storage section 12 through the communication section 21, the communication section 13, and the motor drive controller 11. Data representing the "inside amount (%) after conversion" and the "12-terminal input voltage (V)" are read as related items, and the related items are decided. In this case, data representing the change range (0.00 to 400.00) and the related item names (Ref) and (12) are read as related information, and are displayed on the display section 24.

Subsequently, the setting display controller 23 displays a specific numerical value of the "12-terminal (gain)" of the setting item on the display section 24. For example, "120.02%" is displayed as shown in FIG. 15.

Further, the setting display controller 23 displays the specific numerical values of the current "inside amount (%) after conversion" and the current "12-terminal input voltage (V)" on the display section 24.

Meanwhile, the "inside amount (%) after conversion" is a computed value that is obtained, when the motor drive controller 11 of the drive device body 10 obtains the "12-terminal input voltage (V)" from the command device 4 through the command input section 14, by the computation using this input value. As shown in FIG. 15, for example, "67.21%" and "+5.6V" are displayed as the specific numerical values of the "inside amount (%) after conversion" and the "12-terminal input voltage (V)". The "inside amount (%) after conversion" and the "12-terminal input voltage (V)" are read from the motor drive controller 11 in every predetermined period, and display is updated so that the latest related information is displayed.

Subsequently, the setting content is changed.

Subsequently, an operator increases or decreases the "12-terminal (gain)" by pressing the up key 25b or the down key 25h. Then, the setting display controller 23 increases or decreases the "12-terminal (gain)" from "120.02%" of the "12-terminal (gain)", which is currently set, and displays the increased or decreased "12-terminal (gain)" on the display section 24. For example, "120.05%" is displayed.

Subsequently, the setting display controller 23 reads the "12-terminal input voltage (V)" from the motor drive controller 11 of the drive device body 10, and reads the current "inside amount (%) after conversion", which is computed using this detection value by the motor drive controller 11, from the motor drive controller 11 of the drive device body 10. The setting display controller 23 displays the current "inside amount (%) after conversion" and the current "12-terminal input voltage (V)" on the display section 24. For example, "67.25%" and "5.8 V" are displayed.

The same operation as described above is performed until an output intended by an operator appears.

As described above, the "inside amount (%) after conversion" and the "12-terminal input voltage (V)" are simultaneously displayed on the display section 24 of the setting display unit 20 in real time according to the change of the output of the motor drive device 1 that is affected by setting. Accordingly, while instantly checking the "inside amount (%) after conversion" and the "12-terminal input voltage (V)", it is possible to perform setting so that an output becomes optimum. Therefore, setting becomes very easy.

That is, since information, which is required to change a set value, is collectively displayed on one screen, special measuring instruments are not required and the number of operations can be reduced in Examples 1, 2, and 3.

Example 4

Subsequently, more specific Example 4 of a setting item and a related item will be described. Even in this example, external devices are connected to the setting display unit 20 that has been described with reference to FIGS. 1 to 7. As shown in FIGS. 13 and 14, a command device 4 is connected to the command input section 14 and various commands are input to the command input section 14. Further, an external device 5 is connected to the monitor output section 17 and the monitor output section 15 outputs a monitoring signal to the outside.

The setting item of this example is a conversion factor used to convert an analog voltage signal, which is input to the motor drive device, of the data table shown in FIG. 10 into an internal command value, and is "C32: 12-terminal (gain)". "C32" is a setting item number of the setting item. "12-terminal (gain)" is a setting item name of the setting item. Further, a related item 1 is a "12-terminal input voltage (V)", and related information is the actual input value thereof. Furthermore, related item 2 is an "inside amount (%) after conversion", and related information is a computed value that is calculated using not only an input value but also the "12-terminal input voltage (V)". Example 4 is the same as the previous Example 3 in this respect. However, in this example, a conversion pattern, which is determined by the change of a set value of setting item "C32: 12-terminal (gain)", is made into a graph with the change of a set value of setting item "C32: 12-terminal (gain)" and is displayed, and numerical value data of the "12-terminal input voltage (V)" and the "inside amount (%) after conversion", which are related information, and figures on the conversion pattern are expressed as graphs.

Figure 16:
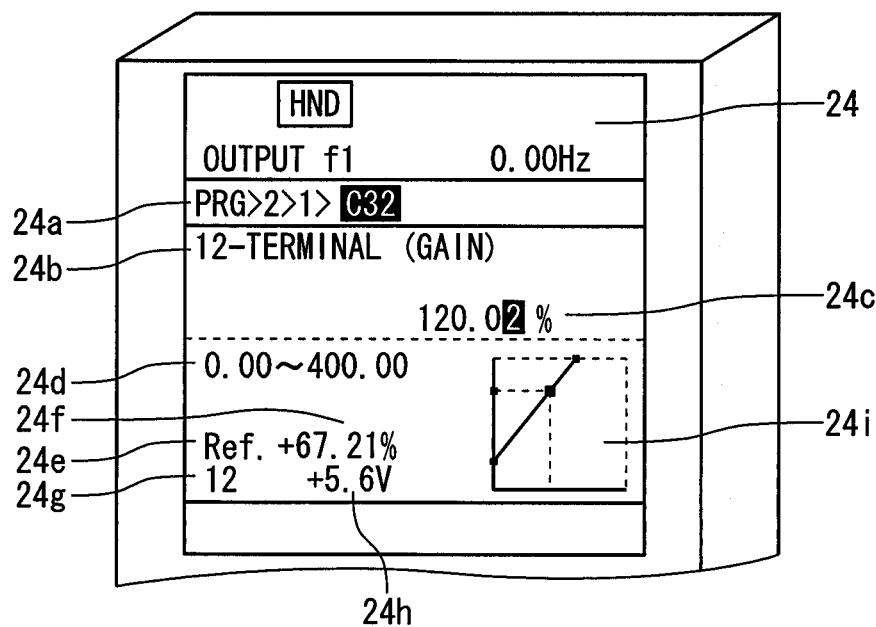
FIG. 16 is a view showing a display section of a setting display unit according to Example 4.

FIG. 16 is a view showing the display of the setting display unit. The display section 24 displays "C32" as the setting item number 24a of the setting item. Further, the display section 24 displays the "12-terminal (gain)" as the setting item name 24b of the setting item.

Furthermore, the display section 24 displays a specific numerical value (120.02% in FIG. 16) as the "inside amount (%) after conversion" that is the setting content 24c of the setting item.

Moreover, the display section 24 displays a specific numerical value (0.00 to 400.00 in FIG. 16) as a change range 24d of the related information of the related item 1.

Further, the display section 24 displays "Ref" as a related item name 24e of the related information of the related item 1.

Furthermore, the display section 24 displays a specific numerical value (+67.21% in FIG. 16) as the "inside amount (%) after conversion" that is a computed value 24f of the related information of the related item 1.

Moreover, the display section 24 displays "12" as a related item name 24g of related information of the related item 2.

Further, the display section 24 displays a specific numerical value (+5.6 V in FIG. 16) as the "12-terminal input voltage (V)" that is a detection value 24h of the related information of the related item 2.

Furthermore, the display section 24 displays a graph 24i (a graph shown on the right side in FIG. 16) of the related information of the related item 2. A black spot on a line represents +67.21%.

Subsequently, the setting of the setting display unit 20 and the operation of the motor drive device 1 will be described.

First, an operator selects a setting item by pressing the up key 25b or the down key 25h, and ends selection when "C32" and "12-terminal input (gain)" are displayed on the display section 24. For example, when the set key 25e is pressed, the setting display controller 23 decides the setting item.

Subsequently, the setting display controller 23 reads the setting content, the related item, and the related information, which are registered in association with this setting item, from the storage section 12 through the communication section 21, the communication section 13, and the motor drive controller 11. Data representing the "inside amount (%) after conversion" and the "12-terminal input voltage (V)" are read as related items, and the related items are decided. In this case, data representing the change range (0.00 to 400.00) and the related item names (Ref) and (12) are read as related information, and are displayed on the display section 24.

Subsequently, the setting display controller 23 displays a specific numerical value of the "12-terminal (gain)" of the setting item on the display section 24. For example, "120.02%" is displayed as shown in FIG. 15.

Further, the setting display controller 23 displays the specific numerical values of the current "inside amount (%) after conversion" and the current "12-terminal input voltage (V)" on the display section 24.

Meanwhile, the "inside amount (%) after conversion" is a computed value that is obtained, when the motor drive controller 11 of the drive device body 10 obtains the "12-terminal input voltage (V)" from the command device 4 through the command input section 14, by the computation using this input value. As shown in FIG. 16, for example, "67.21%" and "+5.6V" are displayed as the specific numerical values of the "inside amount (%) after conversion" and the "12-terminal input voltage (V)". The "inside amount (%) after conversion" and the "12-terminal input voltage (V)" are read from the motor drive controller 11 in every predetermined period, and display is updated.

Further, the motor drive controller 11 of the drive device body 10 generates digital drawing data on the basis of the current "12-terminal input voltage (V)" and the current "inside amount (%) after conversion". The setting display controller 23 reads this graph from the motor drive controller 11 as related information, and makes the display section 24 display numerical value data display values and figures on the conversion pattern. Accordingly, a graph shown in FIG. 16 is displayed.

Subsequently, the setting content is changed.

An operator increases or decreases the "12-terminal (gain)" by pressing the up key 25b or the down key 25h. Then, the setting display controller 23 increases or decreases the "12-terminal (gain)" from "120.02%" of the "12-terminal (gain)", which is currently set, and displays the increased or decreased "12-terminal (gain)" on the display section 24. For example, "120.05%" is displayed.

Subsequently, the setting display controller 23 reads the "12-terminal input voltage (V)" from the motor drive controller 11 of the drive device body 10, and reads the current "inside amount (%) after conversion", which is computed using this detection value by the motor drive controller 11, from the motor drive controller 11 of the drive device body 10. The setting display controller 23 displays the current "inside amount (%) after conversion" and the current "12-terminal input voltage (V)" on the display section 24. For example, "67.25%" and "5.8 V" are displayed.

Further, the setting display controller 35 generates new drawing data that shows a graph on the basis of the current "12-terminal input voltage (V)" and the current "inside amount (%) after conversion", and makes the display section 24 display numerical value data display values and figures on the conversion pattern. For example, a graph shown in FIG. 16 is displayed.

The same operation as described above is performed until an output intended by an operator appears.

As described above, the "inside amount (%) after conversion", the "12-terminal input voltage (V)", and the "graph", which are related information, are simultaneously displayed on the display section 24 of the setting display unit 20 in real time according to the change of the output of the motor drive device 1 that is affected by setting. Accordingly, while instantly checking the "inside amount (%) after conversion", the "12-terminal input voltage (V)", and the "graph", it is possible to perform setting so that an output becomes optimum. Therefore, setting becomes very easy.

That is, only one point, which has a relationship between an input and an output, can be observed in Example 3, but it is possible to see the entire relationship between an input and an output and to check the relationship at a glance in Example 4. Accordingly, it is not necessary to tentatively apply an input voltage signal of the 12-terminal for adjustment, so that it is possible to reduce the number of additional operations.

The motor drive device of the invention has been described above.

According to the invention, when various set values of the motor drive device are adjusted, an adjusted value and related information, such as the working state of the motor drive device or the numerical value data or graphs after and before conversion, are simultaneously displayed in real time. Accordingly, since special measuring instruments are not required and the number of operations can also be reduced, it is possible to easily, quickly, and accurately perform adjustment work.

INDUSTRIAL APPLICABILITY

The motor drive device of the invention can be applied to all the industries, which use a motor, such as a manufacturing field or a transportation field.

REFERENCE SIGNS LIST

1: motor drive device
2: power source
3: motor
4: command device
5: external device
10: drive device body
11: motor drive controller
12: storage section
13: communication section
14: command input section
15: monitor output section
16: control circuit
17: detection circuit
18: power conversion circuit
20: setting display unit
21: communication section
22: storage section
23: setting display controller
24: display section
25: operation key
25a: program key
25b: up key
25c: run key
25d: left shift key
25e: set key
25f: right shift key
25g: reset key
25h: down key
25i: stop key
30: setting display unit
31: communication section
32: storage section
33: setting display controller
34: first display section
35: unit indicator for first display section
36: second display section
37: unit indicator for second display section
38: operation key
38a: program key
38b: up key
38c: forward rotation key
38d: shift key
38e: reverse rotation key
38f: reset key
38g: down key
38h: stop key

The invention claimed is:

1. A motor drive device that is set by a setting display unit, the setting display unit comprising:
a means for displaying a setting content of a setting item and further displaying related information of at least one or more related items, which are related to the setting item, based on the related items, the related information and the number of the related items, wherein the related items are registered in advance in association with the setting item, and
wherein the contents of the related information are changed in conjunction with an operation for changing the setting content of the setting item.

2. A motor drive device comprising a setting display unit and a drive device body, the motor drive device being set by the setting display unit,
the drive device body comprising:
a storage section, wherein at least one or more related items are registered in association with the first setting item in the storage section; and
a motor drive controller connected to the storage section, the setting display unit comprising:
an operation section that selects the setting item and changes the setting content of the selected setting item;
a display section that displays the setting item, the setting content of the setting item, the related items, and related information of the related items; and
a setting display controller connected to the operation section, the display section, and the motor drive controller, and
wherein when the motor drive device is being set by the setting display unit, the setting display controller functions as:
a setting content change means for receiving change of the setting content;
a setting content notification means for notifying the motor drive controller of the changed setting content;
a related information request means for requesting the motor drive controller to notify the setting display controller of related information that is changed according to the changed setting content;
a display means for displaying the related information, which is notified from the motor drive controller, on the display section; and
a decision means for deciding the setting content, wherein the setting display controller functions as the decision means after repeatedly functioning as the setting content change means, the setting content notification means, the related information request means, and the display means.

3. The motor drive device according to claim 2,
wherein the display section comprises:
a first display section that is formed of a 7-Segment LED; and
a second display section that is formed of a liquid-crystal display, and
wherein the setting display controller functions as:
a display means for causing the first display section to display the setting content or the related information, which is related to a numerical value and for causing the second display section to display the setting content or the related information, which is related to a numerical value, a letter or a figure.

4. The motor drive device according to claim 2,
wherein the related information of the related item is at least one of an input value that is obtained by detecting an input from the outside, a detection value that is obtained by detecting an output, a computed value that is calculated by the motor drive controller, and a graph that is generated by the motor drive controller.

5. The motor drive device according to claim 4, wherein the input value, the detection value, or the computed value of the related information is the current value.

6. The motor drive device according to claim 4,
wherein the input value, the detection value, or the computed value of the related information is the maximum value or the minimum value in a certain period.

7. The motor drive device according to claim 4,
wherein the graph of the related information is a graph that extends between the minimum value and the maximum value provided to represent the entirety.

8. The motor drive device according to claim 4,
wherein the input value, the detection value, or the computed value of the related information is the current value, and
wherein the graph of the related information is a graph that is obtained by plotting the input value, the detection value, or the computed value on a line extending between the minimum value and the maximum value provided to represent the entirety.

9. The motor drive device according to claim 4,
wherein the input value of the related information is an analog voltage signal, an analog current signal, a pulse signal, or other input signals that are input to the motor drive device.

10. The motor drive device according to claim 4,
wherein the detection value of the related information is an output frequency, an output current, an output voltage, or other output signals that represent an operation state of the motor drive device.

11. The motor drive device according to claim 4, wherein when the setting item is a conversion factor such as a gain or an offset, the computed value of the related information is a computed value that represents a conversion result of an input/output signal or an operation state of the motor drive device according to the conversion factor.

* * * * *